US012561893B2

(12) United States Patent
Martin Brualla

(10) Patent No.: US 12,561,893 B2
(45) Date of Patent: Feb. 24, 2026

(54) COLOR AND INFRA-RED THREE-DIMENSIONAL RECONSTRUCTION USING IMPLICIT RADIANCE FUNCTIONS

(71) Applicant: GOOGLE LLC, Mountain View, CA (US)

(72) Inventor: Ricardo Martin Brualla, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 217 days.

(21) Appl. No.: 18/262,662

(22) PCT Filed: Feb. 24, 2021

(86) PCT No.: PCT/US2021/070188
§ 371 (c)(1),
(2) Date: Jul. 24, 2023

(87) PCT Pub. No.: WO2022/182421
PCT Pub. Date: Sep. 1, 2022

(65) Prior Publication Data
US 2024/0087214 A1 Mar. 14, 2024

(51) Int. Cl.
*G06T 15/20* (2011.01)
*G06T 7/194* (2017.01)
(Continued)

(52) U.S. Cl.
CPC .............. *G06T 15/20* (2013.01); *G06T 7/194* (2017.01); *G06T 7/90* (2017.01); *G06V 10/82* (2022.01);
(Continued)

(58) Field of Classification Search
None
See application file for complete search history.

(56) References Cited

U.S. PATENT DOCUMENTS

2019/0222777 A1    7/2019  Lovemelt et al.
2020/0034999 A1*   1/2020  Van Heteren ........ A61N 5/1081
(Continued)

FOREIGN PATENT DOCUMENTS

CN        108122281 A     6/2018
WO        2020117657 A1   6/2020

OTHER PUBLICATIONS

Guo et al., "The relightables: Volumetric performance capture of humans with realistic relighting," ACM Transactions on Graphics (ToG) 38.6 (2019): 1-19 (Year: 2019).*
(Continued)

*Primary Examiner* — Anh-Tuan V Nguyen
(74) *Attorney, Agent, or Firm* — Brake Hughes Bellermann LLP

(57)            ABSTRACT
An image is rendered based a neural radiance field (NeRF) volumetric representation of a scene, where the NeRF representation is based on captured frames of video data, each frame including a color image, a widefield IR image, and a plurality of depth IR images of the scene. Each depth IR image is captured when the scene is illuminated by a different pattern of points of IR light, and the illumination by the patterns occurs at different times. The NeRF representation provides a mapping between positions and viewing directions to a color and optical density at each position in the scene, where the color and optical density at each position enables a viewing of the scene from a new perspective, and the NeRF representation provides a mapping between positions and viewing directions to IR values for each of the different patterns of points of IR light from the new perspective.

22 Claims, 16 Drawing Sheets

100

(51) Int. Cl.

| | |
|---|---|
| *G06T 7/90* | (2017.01) |
| *G06V 10/82* | (2022.01) |
| *H04N 13/279* | (2018.01) |
| *H04N 13/344* | (2018.01) |
| *H04N 13/398* | (2018.01) |
| *H04N 23/11* | (2023.01) |

(52) U.S. Cl.
CPC ......... *H04N 13/279* (2018.05); *H04N 13/344* (2018.05); *H04N 13/398* (2018.05); *H04N 23/11* (2023.01); *G06T 2207/10024* (2013.01)

(56) References Cited

U.S. PATENT DOCUMENTS

| | | | | |
|---|---|---|---|---|
| 2021/0097667 A1* | 4/2021 | Barua | .................... | G06V 40/18 |
| 2021/0150672 A1* | 5/2021 | Xu | ......................... | G06N 3/045 |
| 2021/0215601 A1* | 7/2021 | Prater | .................. | G02B 21/365 |
| 2023/0033442 A1* | 2/2023 | Xiang | .................. | G06T 3/4053 |
| 2023/0035959 A1* | 2/2023 | Verkruijsse | .......... | A61B 5/0077 |

OTHER PUBLICATIONS

International Search Report and Written Opinion for PCT Application No. PCT/US2021/070188, mailed on Nov. 18, 2021, 12 pages.

Kerl, et al., "Towards Illumination-Invariant 3D Reconstruction Using TOF RGB-D Cameras", 2014 Second International Conference on 3D Vision, 2014, pp. 39-46.

Mildenhall, et al., "Nerf: Representing Scenes as Neural Radiance Fields for View Synthesis", arXiv:2003.08934v1; Cornell University Library, Mar. 19, 2020, 21 pages.

Yamauchi, et al., "3D Reconstruction of a Human Body From Multiple Viewpoints", Springer-Verlag Berlin Heidelberg, 2007, pp. 439-448.

\* cited by examiner

200

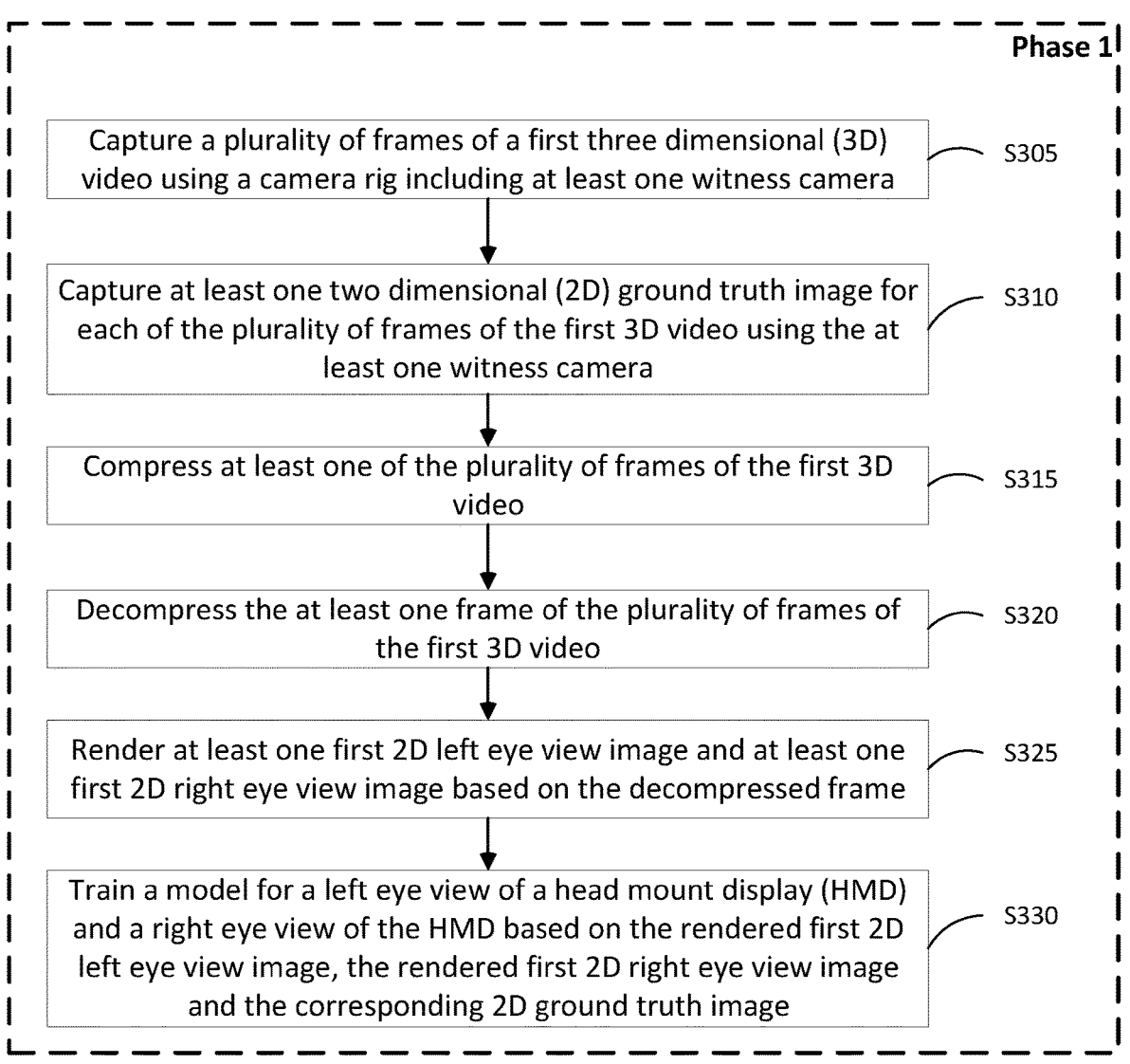

Phase 1

Capture a plurality of frames of a first three dimensional (3D) video using a camera rig including at least one witness camera — S305

Capture at least one two dimensional (2D) ground truth image for each of the plurality of frames of the first 3D video using the at least one witness camera — S310

Compress at least one of the plurality of frames of the first 3D video — S315

Decompress the at least one frame of the plurality of frames of the first 3D video — S320

Render at least one first 2D left eye view image and at least one first 2D right eye view image based on the decompressed frame — S325

Train a model for a left eye view of a head mount display (HMD) and a right eye view of the HMD based on the rendered first 2D left eye view image, the rendered first 2D right eye view image and the corresponding 2D ground truth image — S330

FIG. 3A

Left Prediction        Right Warped        Stereo Consistency

Predictions t, t-1        Groundtruth t, t-1        Temporal Difference

Prediction        Reconstruction Loss        Saliency Loss

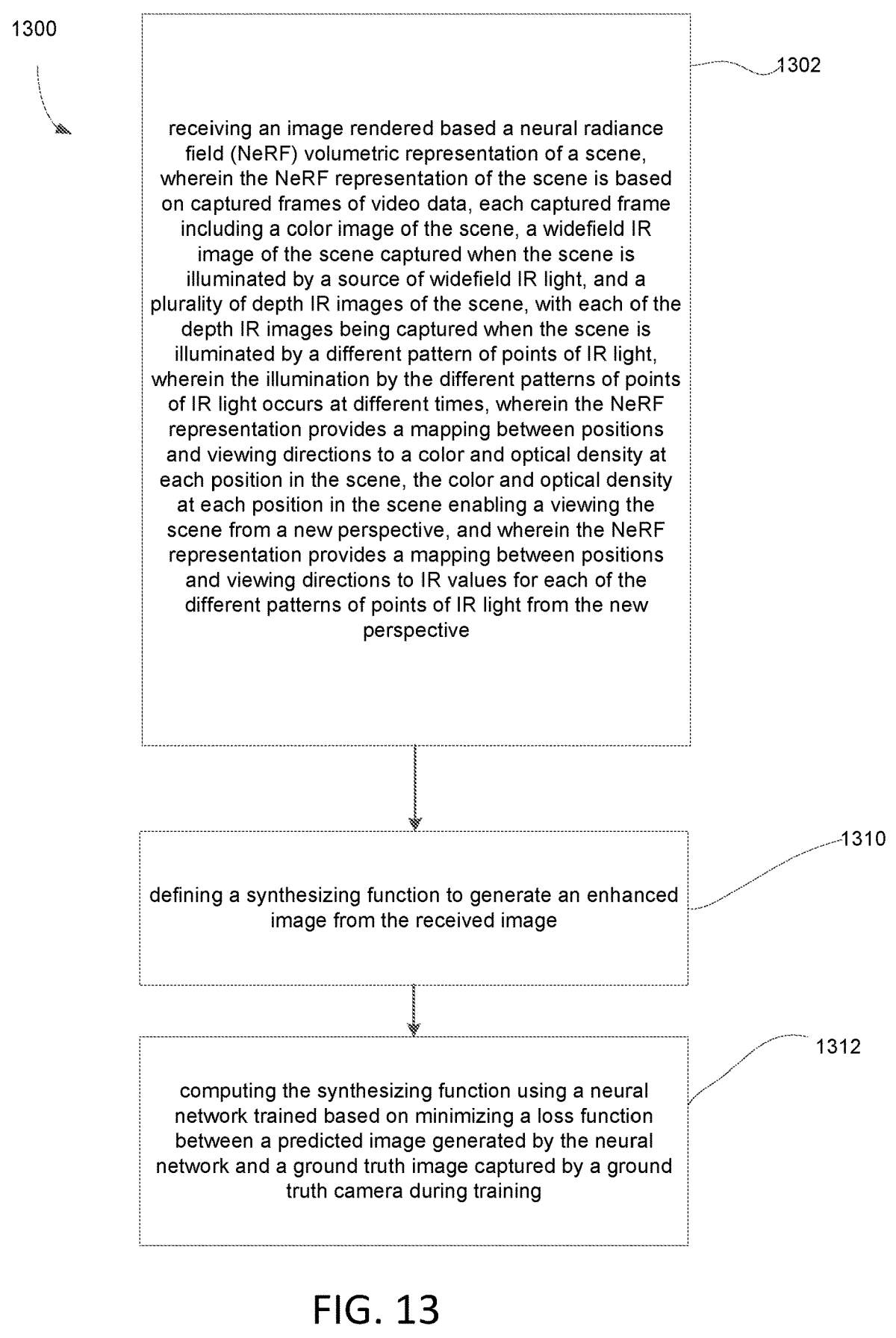

1300

1302 receiving an image rendered based a neural radiance field (NeRF) volumetric representation of a scene, wherein the NeRF representation of the scene is based on captured frames of video data, each captured frame including a color image of the scene, a widefield IR image of the scene captured when the scene is illuminated by a source of widefield IR light, and a plurality of depth IR images of the scene, with each of the depth IR images being captured when the scene is illuminated by a different pattern of points of IR light, wherein the illumination by the different patterns of points of IR light occurs at different times, wherein the NeRF representation provides a mapping between positions and viewing directions to a color and optical density at each position in the scene, the color and optical density at each position in the scene enabling a viewing the scene from a new perspective, and wherein the NeRF representation provides a mapping between positions and viewing directions to IR values for each of the different patterns of points of IR light from the new perspective

1310 defining a synthesizing function to generate an enhanced image from the received image

1312 computing the synthesizing function using a neural network trained based on minimizing a loss function between a predicted image generated by the neural network and a ground truth image captured by a ground truth camera during training

FIG. 13

COLOR AND INFRA-RED THREE-DIMENSIONAL RECONSTRUCTION USING IMPLICIT RADIANCE FUNCTIONS

CROSS REFERENCE TO RELATED APPLICATION

This application is a 35 U.S.C. § 371 National Phase Entry Application from PCT/US2021/070188, filed Feb. 24, 2021, designating the U.S., the disclosure of which is incorporated herein by reference in its entirety.

FIELD

Embodiments relate to capturing and rendering three-dimensional (3D) video. Embodiments further relate to training a neural network model for use in re-rendering an image for display using neural radiance fields (NeRFs).

BACKGROUND

The rise of augmented reality (AR) and virtual reality (VR) has created a demand for high quality display of 3D content (e.g., humans, characters, actors, animals, and/or the like) using performance capture rigs (e.g., camera and video rigs). Recently, real-time performance capture systems have enabled new use cases for telepresence, augmented videos and live performance broadcasting (in addition to offline multi-view performance capture systems), many of which adaptively provide a computer-generated view of a scene depending on the location and viewpoint of a viewer.

Some computers configured to render computer graphic objects can render the objects at a specified view given multiple, existing views. For example, given several depth images and color images captured from cameras about a scene that includes such computer graphic objects, a goal may be to synthesize a new view of the scene from a different viewpoint. The scene can be either real, in which case the views are captured using physical color and depth sensors, or synthetic, in which case the views are captured using rendering algorithms such as rasterization. For a real scene, there exist many depth-sensing technologies, such as time-of-flight sensors, structured-light-based sensors, and stereo or multi-view stereo algorithms. Such technologies may involve visible or infrared sensors with passive or active illumination patterns, where the patterns may be temporally varying.

Existing performance capture systems can suffer from one or more technical problems, including some combination of distorted geometry, poor texturing, and inaccurate lighting, poorly resolved edges, inaccurate colors and therefore and therefore can make it difficult to reach the level of quality required in AR and VR applications. These technical problems can result in a less than desirable final user experience.

SUMMARY

In at least one aspect, a method includes receiving an image rendered based a neural radiance field (NeRF) volumetric representation of a scene, where the NeRF representation of the scene is based on captured frames of video data, each captured frame including a color image of the scene, a widefield IR image of the scene captured when the scene is illuminated by a source of widefield IR light, and a plurality of depth IR images of the scene. Each of the depth IR images is captured when the scene is illuminated by a different pattern of points of IR light, and the illumination by the different patterns of points of IR light occurs at different times. The NeRF representation provides a mapping between positions and viewing directions to a color and optical density at each position in the scene, where the color and optical density at each position in the scene enables a viewing of the scene from a new perspective, and the NeRF representation provides a mapping between positions and viewing directions to IR values for each of the different patterns of points of IR light from the new perspective. A synthesizing function is defined to generate an enhanced image from the received image, and the synthesizing function is computed using a neural network trained based on minimizing a loss function between a predicted image generated by the neural network and a ground truth image captured by a ground truth camera during training.

Implementations can include one or more of the following features, alone or in any combination with each other.

The method can further include, prior to receiving the image: capturing a 3D model of a scene using a volumetric capture system and rendering the image based on the NeRF volumetric representation.

The ground truth camera and the volumetric capture system can both be directed to a view during training, and the ground truth camera can produce higher quality images than the volumetric capture system.

The NeRF representation of the scene can be configured to generate, for a plurality of viewing positions and viewing directions with respect to the scene, position-specific and viewpoint-specific color, IR, and density image data of the scene.

The position-specific and viewpoint-specific IR image data can include widefield IR image data and patterned IR image data for each of the different pattern of points of IR light.

The loss function can include a reconstruction loss based on a reconstruction difference between a segmented ground truth image mapped to activations of layers in a neural network and a segmented predicted image mapped to activations of layers in a neural network, the segmented ground truth image being segmented by a ground truth segmentation mask to remove background pixels and the segmented predicted image being segmented by a predicted segmentation mask to remove background pixels, where the predicted segmentation mask is predicted based on a combination of both visible light information captured for a frame and IR light captured for a frame.

The reconstruction difference can be saliency re-weighted to down-weight reconstruction differences for pixels above a maximum error or below a minimum error.

The loss function can include a mask loss based on a mask difference between a ground truth segmentation mask and a predicted segmentation mask, where the predicted segmentation mask is predicted based on a combination of both visible light information captured for a frame and IR light captured for a frame.

The predicted image can be one of a predicted stereo pair of images and the loss function can include a stereo loss based on a stereo difference between the predicted stereo pair of images.

The neural network can be based on a fully convolutional model.

Computing the synthesizing function using a neural network can include computing the synthesizing function for a left eye viewpoint and computing the synthesizing function for a right eye viewpoint.

Computing the synthesizing function using a neural network can be performed in real time.

The color image of the scene for a frame can include a de-mosaiced color channel.

The color image of the scene for a frame can include three independent, non-de-mosaiced color channels, and where captured frames of video data upon which the NeRF representation of the scene is based include the three independent, non-de-mosaiced color channels.

In another general aspect, a performance capture system includes a volumetric capture system configured to render at least one image reconstructed from at least one viewpoint of a captured 3D model, the at least one image including imperfections and a rendering system configured to receive the at least one image from the volumetric capture system and to generate, in real time, at least one enhanced image in which the imperfections of the at least one received image are reduced. The rendering system includes a neural network configured to generate the at least one enhanced image by training prior to use, the training including minimizing a loss function between predicted images generated by the neural network during training and corresponding ground truth images captured by at least one ground truth camera coordinated with the volumetric capture system during training, where the minimization of the loss function is based on captured frames of video data, each captured frame including a color image of a scene, a widefield IR image of the scene captured when the scene is illuminated by a source of widefield IR light, and a plurality of depth IR images of the scene, with each of the depth IR images being captured when the scene is illuminated by a different pattern of points of IR light.

BRIEF DESCRIPTION OF THE DRAWINGS

Example embodiments will become more fully understood from the detailed description given herein below and the accompanying drawings, where like elements are represented by like reference numerals, which are given by way of illustration only and thus are not limiting of the example embodiments.

FIGS. 3A and 3B illustrate a method for rendering a frame of 3D video according to at least one example embodiment.

FIG. 13 is a schematic flow chart of a process 1300 implementing techniques described herein.

Figure 1:
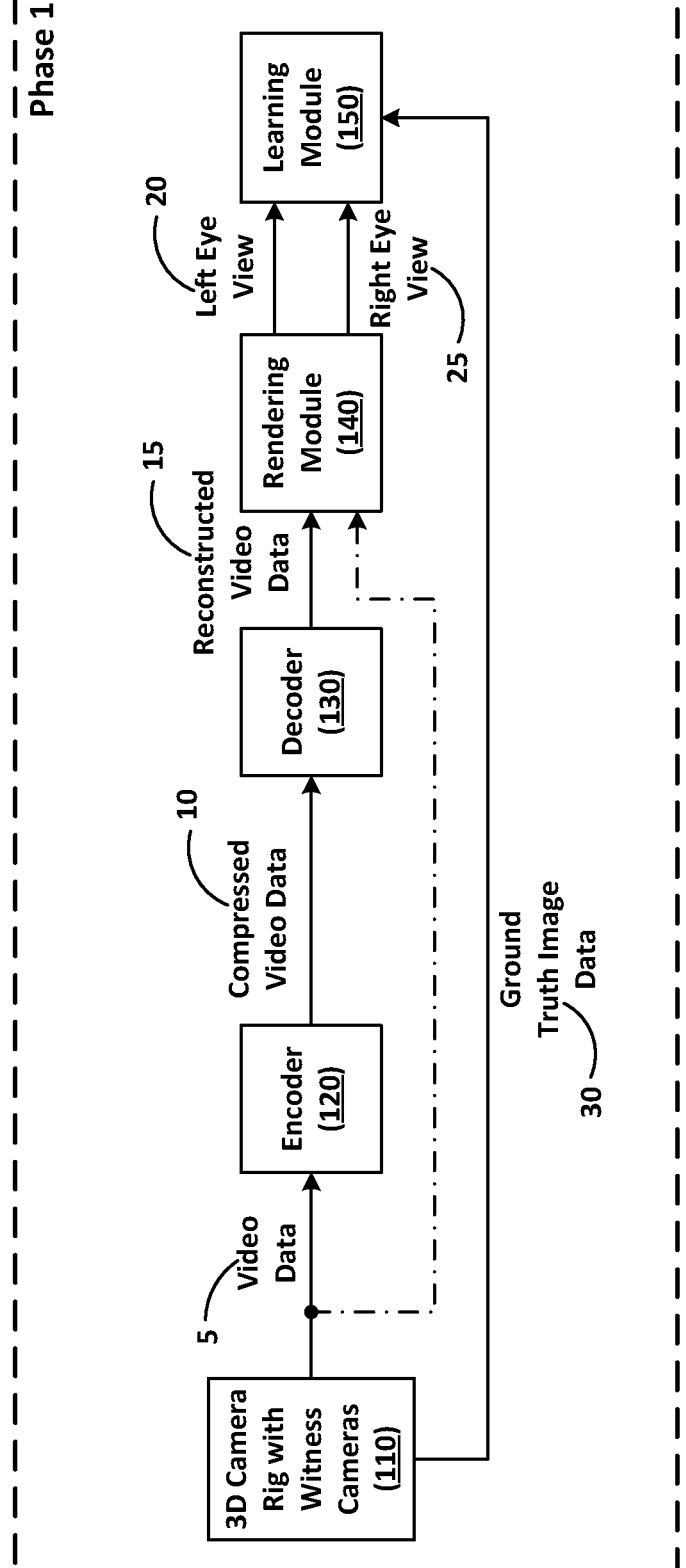
FIG. 1 illustrates a block diagram of a performance capture system according to at least one example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment and should not be interpreted as defining or limiting the range of values or properties encompassed by example embodiments. For example, the relative thicknesses and positioning of layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Conventional approaches to synthesizing new views of a scene from existing views employ neural radiance fields (NeRFs). In this approach, a static scene can be represented as a continuous five-dimensional function that outputs the radiance emitted in each direction $(\theta,\varphi)$ at each point $(x, y, z)$ in space, and a density at each point which acts like a differential opacity controlling how much radiance is accumulated by a ray passing through $(x, y, z)$. The approach optimizes a deep fully-connected neural network without any convolutional layers, often referred to as a multilayer perceptron (MLP), to represent the five-dimensional function by regressing from a single 5D coordinate $(x, y, z, \theta, \varphi)$ to a single volume density and view-dependent RGB color.

To render this five-dimensional function, or NeRF, one can: 1) march camera rays through the scene to generate a sampled set of 3D points, 2) use those points and their corresponding 2D viewing directions as input to the neural network to produce an output set of colors and densities, and 3) use classical volume rendering techniques to accumulate those colors and densities into a 2D image. Because this process is naturally differentiable, one can use gradient descent to optimize the NeRF by minimizing the error between each observed image and the corresponding views rendered from our representation. Minimizing this error across multiple views encourages the network to predict a coherent model of the scene by assigning high volume densities and accurate colors to the locations that contain the true underlying scene content.

A NeRF is a continuous, volumetric representation. It is a function F: $(x, d) \rightarrow (c, \sigma)$ which maps a 3D position $x=(x, y, z)$ and viewing direction $d=(\phi, \theta)$ to an RGB color $c=(r, g, b)$ and density $\sigma$. Coupled with volume rendering techniques, NeRFs can represent scenes with photo-realistic quality. For this reason, NeRFs are built upon to tackle the problem of photo-realistic human capture.

Although highly successful, NeRFs are can suffer from some imperfections when attempting to represent scenes with humans with lifelike image quality. For example, features of the scene can be rendered with distorted geometry, poor texturing, inaccurate lighting, poorly resolved edges, inaccurate colors, etc.

To address these limitations, machine learning techniques and models can be used to enhance the performance of NeRFs. For example, high quality training data can be generated and used to train machine learning models that are used to improve the rendering of high-quality images from lower quality images based on NeRFs. In some implementations, the training data can include, in addition to color (e.g., RGB) images of a scene, widefield infrared images of the scene and texture data based on multiple different infrared patterns overlaid on objects in the scene. The infrared widefield images and infrared texture data can be used in machine learning models that generate the NeRFs of a scene.

A performance capture rig (i.e., performance capture system) may be used to capture a subject (e.g., person) and their movements in three dimensions (3D). The performance capture rig can include a volumetric capture system configured to capture data necessary to generate a 3D model (e.g., a NeRF) and (in some cases) to render a 3D volumetric reconstruction (i.e., an image) using volumetric reconstruction of a view. A variety of volumetric capture systems can be implemented, including (but not limited to) active stereo cameras, time of flight (TOF) systems, lidar systems, passive stereo cameras and the like. In some implementations a single volumetric capture system can be used, while in other implementations, a plurality of volumetric capture systems may be used (e.g., in a coordinated capture).

The volumetric reconstruction may render a video stream of images (e.g., in real time) and may render separate images corresponding to a left-eye viewpoint and a right-eye viewpoint. The left-eye viewpoint and right eye-viewpoint 2D images may be displayed on a stereo display. The stereo display may be a head-tracked stereo display. A variety of stereo displays may be implemented, including (but not limited to) augmented reality (AR) glasses display, virtual reality (VR) headset display, auto-stereo displays (e.g., head-tracked auto-stereo displays). In some implementations, a stereo display may be used in a telepresence system in which a highly realistic rendering of a person at a first location can be presented to a person at a second location.

Imperfections (i.e., artifacts) may exist in the rendered 2D image(s) and/or in their presentation on the stereo display. The artifacts may include graphic artifacts such as intensity noise, low resolution textures, and off colors. The artifacts may further include stereo artifacts such as inconsistent left/right views. The artifacts may be due limitations/problems associated with performance capture rig. For example, due to complexity or cost constraints the performance capture rig may be limited in the data collected. Also, the artifacts may be due to limitations/problems associated with gathering and transmitting depth information, so that 3D images can be rendered. Additionally, the artifacts may be due to limitations associated with transferring data over a network (e.g., bandwidth). The disclosure describes systems and methods to reduce or eliminate the artifacts regardless of their source. Accordingly, the disclosed systems and methods are not limited to any particular performance capture system or stereo display.

In one possible implementation, technical problems associated with existing performance capture systems can result in the 3D volumetric reconstructed images containing holes, noise, low resolution textures, and color artifacts. These technical problems can result in a less than desirable user experience in VR and AR applications.

Technical solutions to the above-mentioned technical problem implements machine learning to enhance volumetric videos in real-time. Geometric non-rigid reconstruction pipelines can be combined with deep learning to produce higher quality images. The disclosed system can focus on visually salient regions (e.g., human faces), discarding non-relevant information, such as the background, where the background is precisely defined, and can use multi-spectral information, including visible light (color) information and infrared (IR) light information gathered from a scene, to generate high quality images. The described solution can produce temporally stable renderings for implementation in VR and AR applications, where left and right views should be consistent for an optimal user experience.

Figures 7A, 7B:
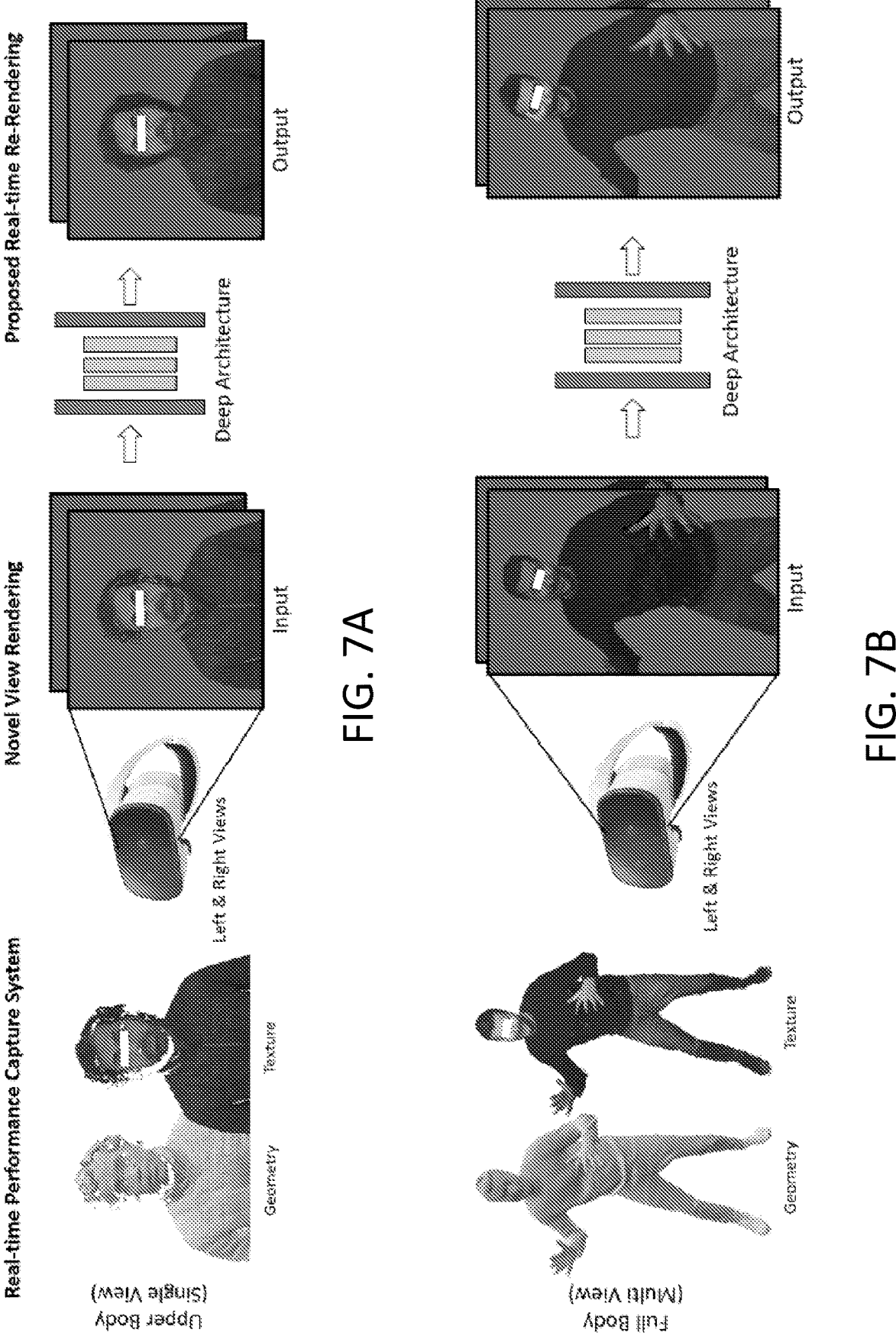
FIGS. 7A and 7B pictorially illustrates a deep learning technique that generates visually enhanced re-rendered images from low quality images according to at least one example embodiment.

The technical solutions can include real-time performance capture (i.e., image and/or video capture) to obtain approximate geometry and texture in real time. The final 2D rendered output of such systems can be low quality due to geometric artifacts, poor texturing, and inaccurate lighting. Therefore, example implementations can use deep learning to enhance the final rendering to achieve higher quality results in real-time. For example, a deep learning architecture that takes, as input, a deferred shading deep buffer and/or the final 2D rendered image from a multiview performance capture system, and learns to enhance such imagery in real-time, producing a final high-quality re-rendering (see FIGS. 7A and 7B) can be used. This approach can be referred to as neural re-rendering.

Figure 8:
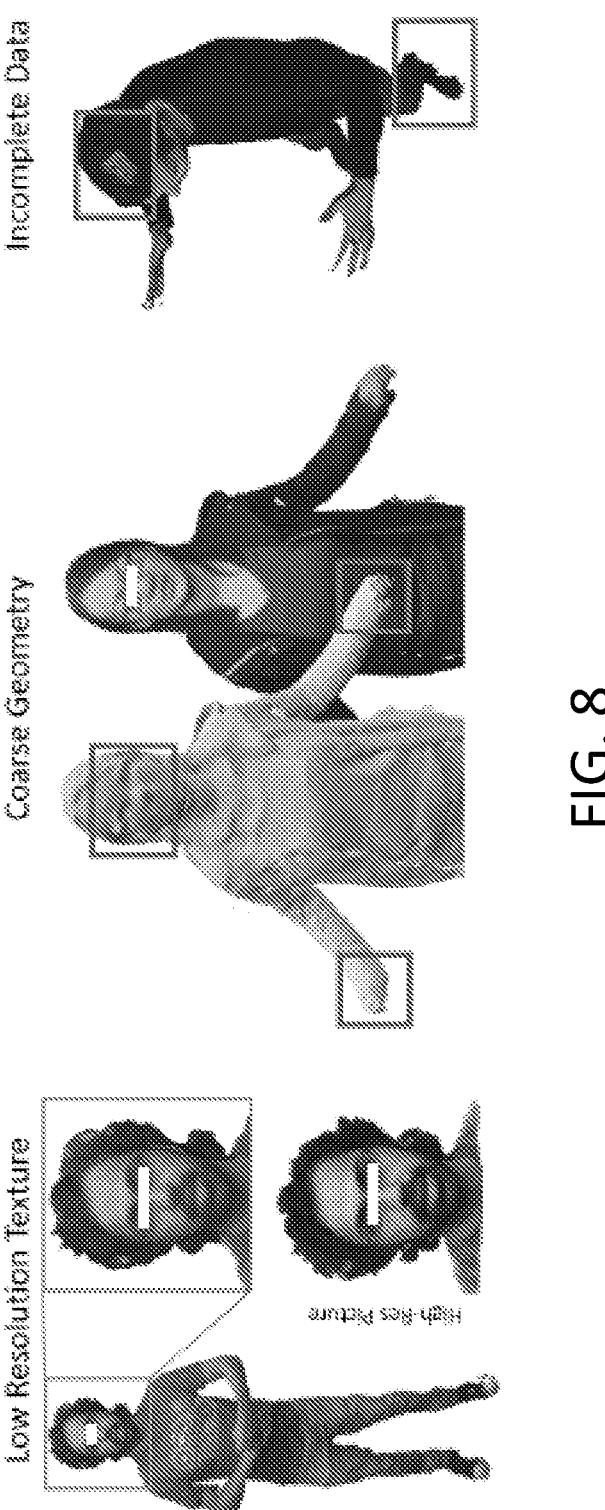
FIG. 8 pictorially illustrates examples of low-quality images.

Described herein is a neural re-rendering technique. Technical advantages of using the neural re-rendering technique include learning to enhance low-quality output from performance capture systems in real-time, where images contain holes, noise, low resolution textures, and color artifacts. Some examples of low-quality images are shown in FIG. 8. In addition, a binary segmentation mask can be predicted that isolates the user from the rest of the background. Technical advantages of using the neural re-rendering technique also include a method for reducing the overall bandwidth and computation required of such a deep architecture, by forcing the network to learn the mapping from low-resolution input images to high-resolution output renderings in a learning phase and then using low-resolution images (e.g., enhanced) from the live performance capture system.

Technical advantages of using the neural re-rendering technique also include a specialized loss function can use semantic information to produce high quality results on faces. To reduce the effect of outliers a saliency reweighing scheme that focuses the loss on the most relevant regions can be used. The loss function is design for VR and AR headsets, where the goal is to predict two consistent views of the same object. Technical advantages of using the neural re-rendering technique also include temporally stable re-rendering by enforcing consistency between consecutive reconstructed frames.

FIG. 1 illustrates a block diagram of a performance capture system (i.e., capture system) according to at least one example embodiment. As shown in FIG. 1, the capture system 100 includes a 3D camera rig with witness cameras 110, an encoder 120, a decoder 130, a rendering module 140 and a learning module 150. The camera rig with witness cameras 110 includes a first set of cameras used to capture 3D video, as video data 5, and at least one witness camera used to capture high quality (e.g., as compared to the first set of cameras) images, as ground truth image data 30, from at least one viewpoint. The camera rig also can include infrared sensors to capture infrared (IR) that may be used, for example, to determine depth and/or texture information and/or to distinguish objects or subjects in a scene from background. A ground truth image data 30 can be an image including more detail (e.g., higher definition, higher resolution, higher number of pixels, addition of more/better depth information, and/or the like) and/or an image including post-capture processing to improve image quality as compared to a frame or image associated with the 3D video. Ground truth image data 30 can include (a set of) the ground truth image, a label for the image, image segmentation information, image and/or segment classification information, location information and/or the like. The ground truth image data 30 is used by the learning module 150 to train a neural network model(s). Each image of the ground truth image data 30 can have a corresponding frame of the video data 5.

The encoder 120 can be configured to compress the 3D video captured by the first set of cameras. The encoder 120 can be configured to receive video data 5 and generate compressed video data 10 using a standard compression technique. The decoder 130 can be configured to receive compressed video data 10 and generate reconstructed video data 15 using the inverse of the standard compression technique. The dashed/dotted line shown in FIG. 1 indicates that, in an alternate implementation, the encoder 120 and the decoder 130 can be bypassed and the video data 5 can be input directly into the rendering module 140. This can reduce the processing resources used by the capture system 100. However, the learning module 150 may not include errors introduced by compression and decompression in a training process.

The rendering module 140 is configured to generate a left eye view 20 and a right eye view 25 based on the reconstructed video data 15 (or the video data 5). The left eye view 20 can be an image for display on a left eye display of a head-mounted display (HMD). The right eye view 25 can be an image for display on a right eye display of a HMD. Rendering can include processing 3D model of a scene (e.g., a NeRF of the scene) associated the reconstructed video data 15 (or the video data 5) to generate a digital image. The 3D model can include, for example, shading information, lighting information, texture information, geometric information and the like. Rendering can include implementing a rendering algorithm by a graphical processing unit (GPU). Therefore, rendering can include passing the 3D model to the GPU.

The learning module 150 can be configured to train a neural network or model to generate a high-quality image based on a one or more low-quality images, which may include images captured in different wavelength ranges that may include visible and IR wavelength ranges. In an example implementation, an image is iteratively predicted based on the left eye view 20 (or the right eye view 25) using the neural network or model. Then, each iteration of the predicted image is compared to a corresponding image selected from the ground truth image data 30 using a loss function until the loss function is minimized (or below a threshold value). The learning module 150 is described in more detail below.

Figure 2A:
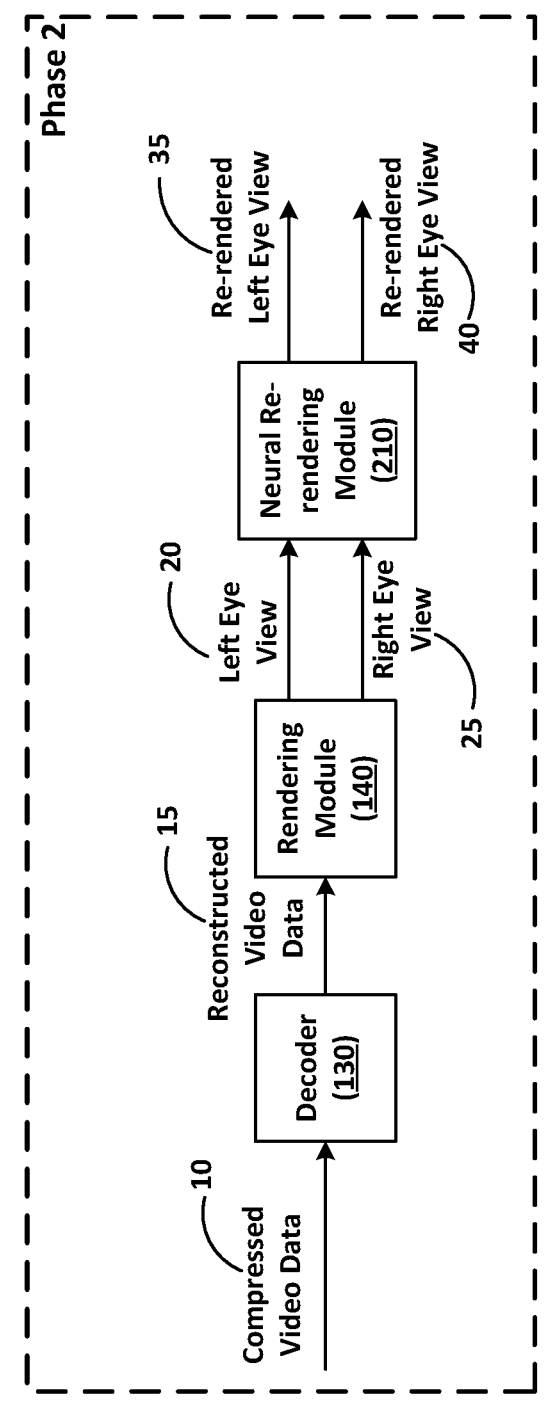
FIG. 2A illustrates a block diagram of a rendering system according to at least one example embodiment.

FIG. 2A illustrates a block diagram of a rendering system according to at least one example embodiment. As shown in FIG. 2A, the rendering system 200 includes the decoder 130, the rendering module 140 and a neural re-rendering module 210. As shown in FIG. 2A, compressed video data 10 is decompressed by the decoder 130 to generate the reconstructed video data 15. The rendering module 140 then generates the left eye view 20 and the right eye view 25 based on the reconstructed video data 15.

The neural re-rendering module 210 is configured to generate a re-rendered left eye view 35 based on the left eye view 20 and to generate a re-rendered right eye view 40 based on the right eye view 25. The neural re-rendering module 210 is configured to use the neural network or model trained by the learning module 150 to generate the re-rendered left eye view 35 as a higher quality representation of the left eye view 20. The neural re-rendering module 210 is configured to use the neural network or model trained by the learning module 150 to generate the re-rendered right eye view 40 as a higher quality representation of the right eye view 25. The neural re-rendering module 210 is described in more detail below.

Figure 3B:
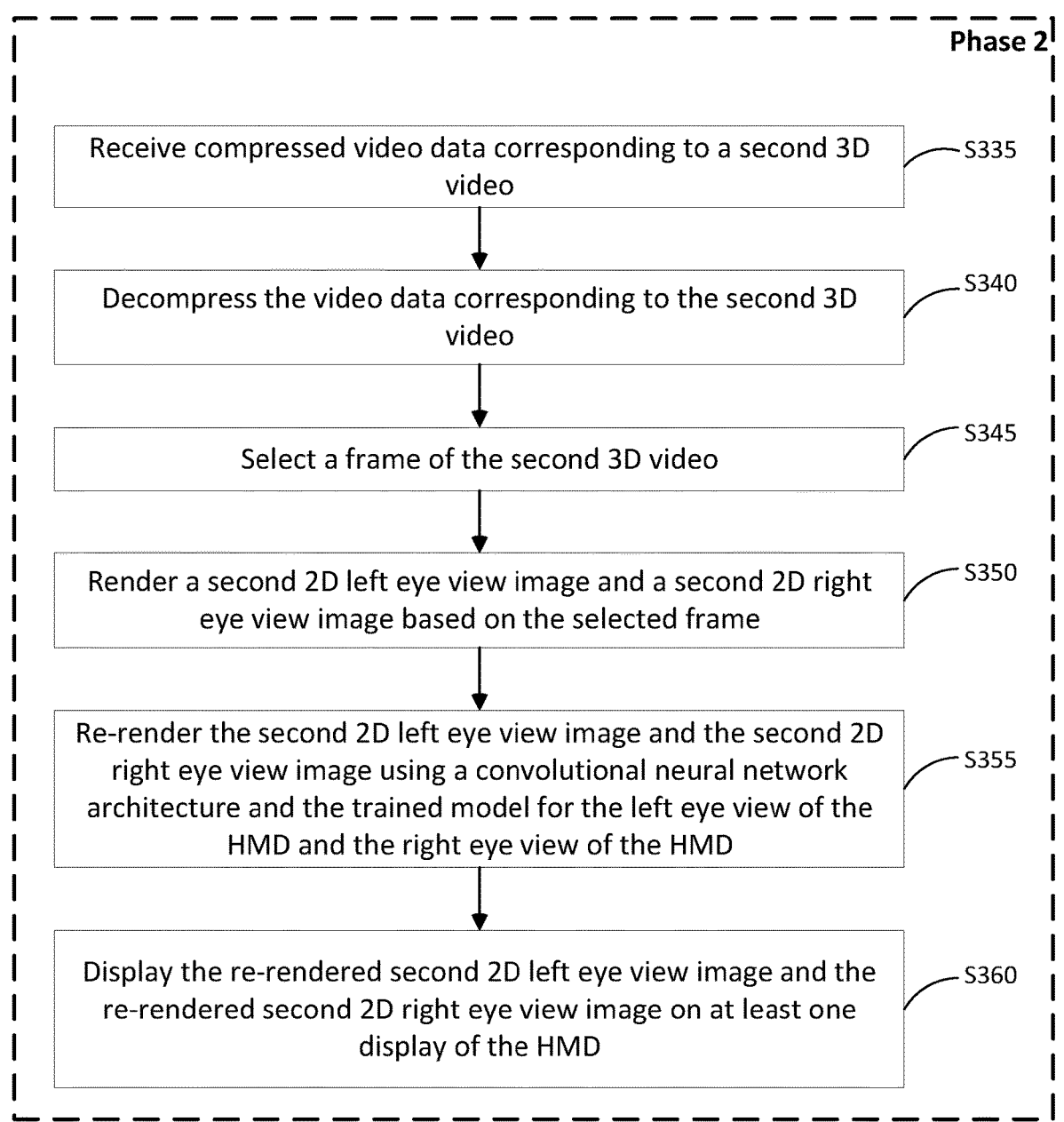

The capture system 100 shown in FIG. 1 can be a first phase (or phase 1), and the rendering system 200 shown in FIG. 2A can be a second phase (or phase 2) of an enhanced video rendering technique. FIGS. 3A (phase 1) and 3B (phase 2) illustrate a method for rendering a frame of 3D video according to at least one example embodiment. The steps described with regard to FIGS. 3A and 3B may be performed due to the execution of software code stored in a memory associated with an apparatus and/or service (e.g., a cloud computing service) and executed by at least one processor associated with the apparatus and/or service. However, alternative embodiments are contemplated such as a system embodied as a special purpose processor. Although the steps described below are described as being executed by a processor, the steps are not necessarily executed by a same processor. In other words, at least one processor may execute the steps described below with regard to FIGS. 3A and 3B.

Figure 2B:
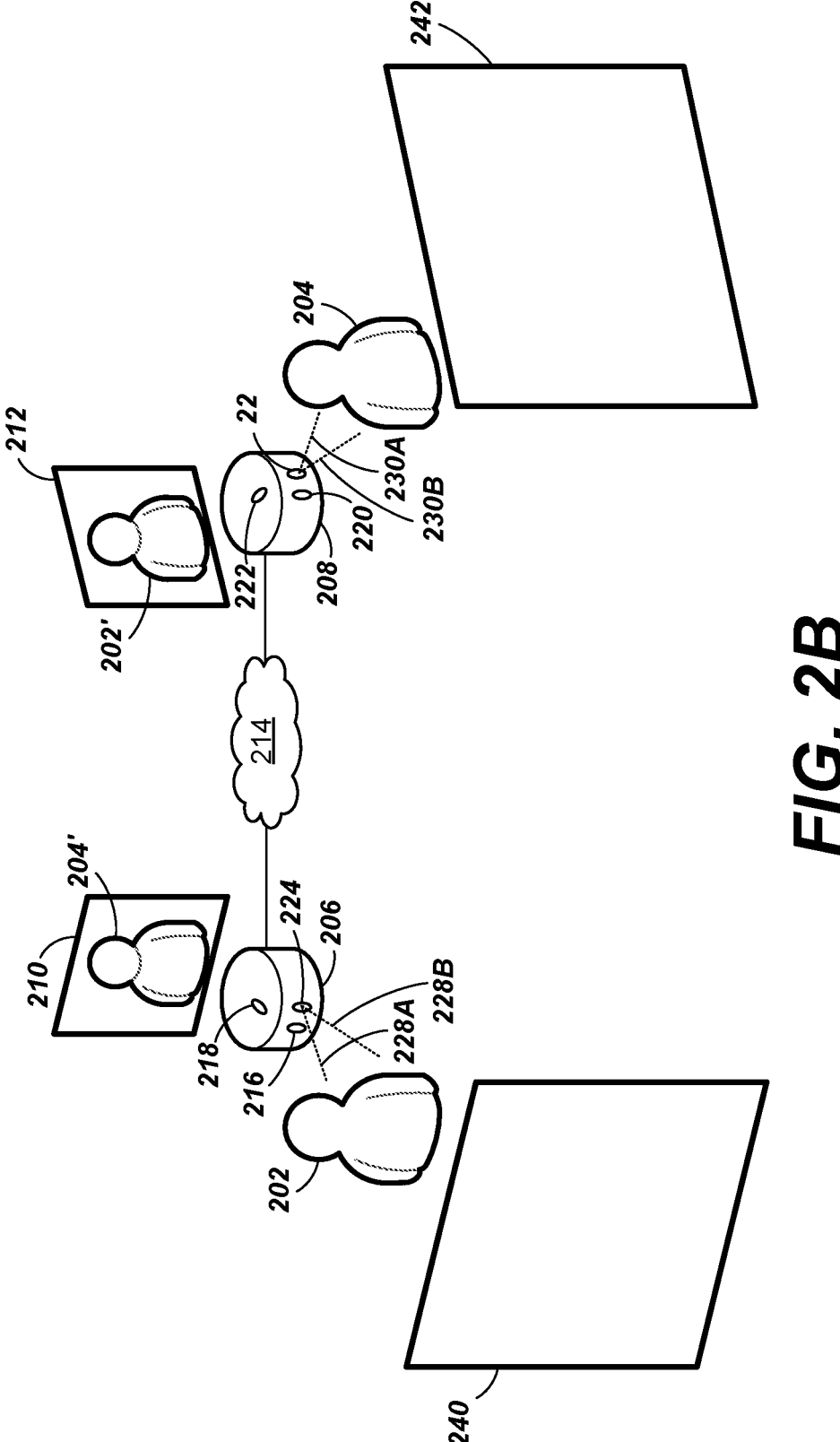
FIG. 2B illustrates a block diagram of an example of a 3D content system according to at least one example embodiment.

FIG. 2B illustrates a block diagram of an example of a 3D content system according at least one example embodiment. The 3D content system 201 can be used by multiple people. Here, the 3D content system 201 is being used by a first person 202 and a second person 204. For example, the first person 202 and the second person 204 are using the 3D content system 201 to engage in a 3D telepresence session. In such an example, the 3D content system 201 can allow each person 202, 204 to see a highly realistic and visually congruent representation of the other, thereby facilitating them to interact with each other similar to them being in the physical presence of each other.

Each person 202, 204 can have a corresponding 3D pod. Here, the first person 202 has a pod 206, and the second person 204 has a pod 208. The pods 206 and 208 can provide functionality relating to 3D content, including, but not limited to: capturing images for 3D display, processing and presenting image information, and processing and presenting audio information. The pod 206 and/or 208 can include processor and a collection of sensing devices integrated as one unit.

The 3D content system 201 can include one or more 3D displays. Here, a 3D display 210 is provided for the pod 206, and a 3D display 212 is provided for the pod 208. The 3D display 210 and/or 212 can use any of multiple types of 3D display technology to provide a stereoscopic view for the respective viewer (here, the person 202 or 204, for example). In some implementations, the 3D display 210 and/or 212 can include a standalone unit (e.g., self-supported or suspended on a wall). In some implementations, the 3D display 210 and/or 212 can include wearable technology (e.g., a head-mounted display). In some implementations, the 3D display 210 and/or 212 can include an autostereoscopic display assembly.

The 3D content system 201 can be connected to one or more networks. Here, a network 214 is connected to the pod 206 and to the pod 208. The network 214 can be a publicly available network (e.g., the Internet), or a private network, to name just two examples. The network 214 can be wired, or wireless, or a combination of the two. The network 214 can include, or make use of, one or more other devices or systems, including, but not limited to, one or more servers (not shown).

The pod 206 and/or 208 can include multiple components relating to the capture, processing, transmission, or reception of 3D information, and/or to the presentation of 3D content. The pods 206 and 208 can include one or more illumination sources for illuminating the subjects of a scene (e.g., the first and second people 202, 204) with visible and/or IR light and cameras for capturing image content to generate images to be included in a 3D presentation. In some implementations, illumination sources can include IR lasers that shine through diffractive optical elements (DOEs) to generate a pattern of points of IR laser light that illuminate a scene to be imaged. The pattern of points of IR laser light can be generated periodically with a periodicity synced with the frame rate at which visible images of the scene are captured, so that IR images of the pattern of points of IR laser light can obtained within $1/20^{th}$ of a second of obtaining a color image of the scene. The points of IR laser light can be used to determine and assign depth information in the scene from the captured images. In some implementations, multiple different (e.g., non-degenerate) patterns of points of laser light can be generated and used to illuminate the scene, with each of the different patterns being generated periodically with a periodicity synced with the frame rate at which visible images of the scene are captured, so that IR images of each of the different patterns of points of IR laser light can obtained within $1/20^{th}$ of a second of obtaining a color image of the scene. With the use of the multiple patterns, richer information from the multiple patterns can be used to generate better depth data for objects in the scene.

The scene also can be illuminated with a widefield, non-patterned, IR light from one or more of the IR illumination sources, which provide a generally uniform IR light intensity over a wide angle, and IR images can be captured of the scene. The widefield, non-patterned, IR light from one or more of the illumination sources can be generated periodically with a periodicity synced with the frame rate at which visible images of the scene are captured, and IR images (i.e., "guide" images) of the scene can be captured while the scene is illuminated with the widefield, non-patterned, IR light, so that widefield IR images of the scene can obtained within $1/20^{th}$ of a second of obtaining a color image of the scene. The environment in which images of a subject 202, 204 are captured can include a background 240, 242 that has a high reflectivity to IR light, so that IR images of the subjects 202, 204 can be used to distinguish edges of the subject in captured images from the background. The backgrounds 240, 242 can include a fabric material that includes materials that are highly reflective of IR light. For example, the fabric can include metal materials (e.g., metal fibers) that are woven into the fabric. In another example, fibers of the fabric material may be coated with IR reflective pigment (IRP), which may include, for example, metal oxides, ceramic materials, or inorganic materials.

Here, the pod 206 includes cameras 216 and 218, each of which can detect light at one or more wavelength ranges, including visible colors and IR wavelengths. For example, the camera 216 and/or 218 can be disposed essentially within a housing of the pod 206, so that an objective or lens of the respective camera 216 and/or 218 captured image content by way of one or more openings in the housing. In some implementations, the camera 216 and/or 218 can be separate from the housing, such as in form of a standalone device (e.g., with a wired and/or wireless connection to the pod 206). The cameras 216 and 218 can be positioned and/or oriented so as to capture a sufficiently representative view of (here) the person 202. While the cameras 216 and 218 should preferably not obscure the view of the 3D display 210 for the person 202, the placement of the cameras 216 and 218 can generally be arbitrarily selected. For example, one of the cameras 216 and 218 can be positioned somewhere above the face of the person 202 and the other can be positioned somewhere below the face. For example, one of the cameras 216 and 218 can be positioned somewhere to the right of the face of the person 202 and the other can be positioned somewhere to the left of the face. The pod 208 can in an analogous way include cameras 220 and 222, for example.

Cameras 220 and 222 that detect visible light can include photosensor sensor arrays and color filters to allow individual pixels of the senor to detect different wavelengths of light. For example, each pixel include subpixels for detecting red (R), green (G), and blue (B) wavelengths of light. The light signals detected by the subpixels of a pixel can be processed through a demosaicing process to assign a color to the pixel. In some implementations, the light signals detected by the subpixels is not processed through a demosaicing process before sending independent R, G, and B channel data from one pod 206 to another pod 208 though the pipe neural re-rendering module 210. Rather, the independent R, G, and B channel data is processed by the neural re-rendering module 210 at the receiving pod to generate images to be viewed.

The pod 206 and/or 208 can include one or more depth sensors to capture depth data to be used in a 3D presentation. Such depth sensors (e.g., IR-sensitive cameras) can be considered part of a depth capturing component in the 3D content system 201 to be used for characterizing the scenes captured by the pods 206 and/or 208 in order to correctly represent them on a 3D display. Also, the system can track the position and orientation of the viewer's head, so that the 3D presentation can be rendered with the appearance corresponding to the viewer's current point of view. Here, the pod 206 includes a depth sensor 224. Similarly, the pod 208 can include a depth sensor 224. Any of multiple types of depth sensing or depth capture can be used for generating depth data. In some implementations, an assisted-stereo depth capture is performed. The scene can be illuminated using a pattern of points of IR light, which patterns can be generated by lasers and DOEs included in the depth sensors 224, and stereomatching can be performed between two respective cameras. Here, the depth sensor 224 operates, by way of illustration, using IR beams 228A and 228, where the beams 228A and 228 represent multiple beams that generate the patterns of points. The beams 228A and 228B can travel from the pod 206 toward structure or other objects (e.g., the person 202) in the scene that is being 3D captured, and/or from such structures/objects to the corresponding detector in the pod 206, as the case may be. The detected signal(s) can be processed to generate depth data corresponding to some or the entire scene. As such, the beams 228A-B can be considered as relating to the signals on which the 3D content system 201 relies in order to characterize the scene(s) for purposes of 3D representation. For example, the beams 228A-B can include IR signals. Similarly, the pod 208 can operate, by way of illustration, using beams 230A-B.

Depth data can include or be based on information regarding a scene that reflects the distance between a depth sensor (e.g., the depth sensor 224) and an object in the scene. The depth data reflects, for content in an image corresponding to an object in the scene, the distance (or depth) to the object. For example, the spatial relationship between the camera(s) and the depth sensor can be known, and can be used for correlating the images from the camera(s) with signals from the depth sensor to generate depth data for the images.

In some implementations, depth capturing can include an approach that is based on structured light or coded light. For example, a pattern of IR light (e.g., a pattern of dots or a striped pattern) can be distributed onto the scene at a relatively high frame rate. For example, the frame rate can be considered high when the light signals are sufficiently close to each other temporally that the scene is not expected to change in a significant way in between consecutive signals, even if people or objects are in motion. The resulting pattern(s) that are projected onto objects in the scene can be detected by IR sensitive camera(s) in the depth sensor and the detected pattern can be processed (e.g., with triangulation, or other, techniques) to determine the geometry of the scene in one or more regards.

In some implementations, when capturing video data of a scene including, for example, a person 202, 204 for each color image frame of video data of the scene captured by a camera of a pod 206, 208 at least one corresponding widefield IR image of the scene can be captured and a plurality of depth IR images can be captured, with each of the plurality of depth IR images capturing an IR image of a different pattern of IR points on the scene. Then, a machine learning model can be trained using the captured video data, and for each frame of video data. The trained model then can be used to generate enhanced quality frames of video data from low-quality frames of video data based on a color image, a widefield IR image, and a plurality of depth IR images of a scene captured for each frame of the low-quality video data.

The images captured by the 3D content system 201 can be processed and thereafter displayed as a 3D presentation. Here, 3D image 204' is presented on the 3D display 210. As such, the person 202 can perceive the 3D image 204' as a 3D representation of the person 204, who may be remotely located from the person 202. 3D image 202' is presented on the 3D display 212. As such, the person 204 can perceive the 3D image 202' as a 3D representation of the person 202. Examples of 3D information processing are described below.

The 3D content system 201 can allow participants (e.g., the persons 202 and 204) to engage in audio communication with each other and/or others. In some implementations, the pod 206 includes a speaker and microphone (not shown). For example, the pod 208 can similarly include a speaker and a microphone. As such, the 3D content system 201 can allow the persons 202 and 204 to engage in a 3D telepresence session with each other and/or others.

FIG. 3A is a schematic flow chart of a process for training a machine learning model to generate video images. As shown in FIG. 3A, in step S305 a plurality of frames of a first three-dimensional (3D) video are captured using a camera rig including at least one witness camera. The capture of a frame of 3D video data includes: the capture of at least one color image of a scene, the capture of at least one IR image of the scene when the scene is illuminated by a source of widefield IR light; and the capture of a plurality of IR images of the scene, with each of the IR images being captured when the scene is illuminated by a different pattern of points of IR light. In some implementations, the captured color image of the scene can be a demosaiced image. In some implementations, the captured color image of the scene can include raw data (i.e., not demosaiced) of at least three independent color channels (e.g., red, green, and blue) for each pixel of the image. For example, the camera rig (e.g., 3D camera rig with witness cameras 110) can include a first set of cameras used to capture 3D video (e.g., visible and IR image data) and at least one witness camera used to capture high quality (e.g., as compared to the first set of cameras) images (e.g., ground truth image data 30). The plurality of frames of the first 3D video can be video data captured by the first set of cameras.

In step S310 at least one two-dimensional (2D) ground truth image is captured for each of the plurality of frames of the first 3D video using the at least one witness camera. For example, the at least one 2D ground truth image can be a high-quality image captured by the at least one witness camera. The at least one 2D ground truth image can be captured at substantially the same moment in time as a corresponding one of the plurality of frames of the first 3D video.

In step S315 at least one of the plurality of frames of the first 3D video is compressed. For example, the at least one of the plurality of frames of the first 3D video is compressed using a standard compression technique. In step S320 the at least one frame of the plurality of frames of the first 3D video is decompressed. For example, the at least one of the plurality of frames of the first 3D video is decompressed using a standard decompression technique corresponding to the standard compression technique.

In step S325 at least one first 2D left eye view image is rendered based on the decompressed frame and at least one first 2D right eye view image is rendered based on the decompressed frame. For example, a 3D model of a scene corresponding to a frame of the decompressed first 3D video (e.g., reconstructed video data 15) is communicated to a GPU. The GPU can generate digital images (e.g., left eye view 20 and right eye view 25) based on the 3D model of a scene and return the digital images as the first 2D left eye view and the first 2D right eye view.

In step S330 a model for a left eye view of a head mount display (HMD) is trained based on the rendered first 2D left eye view image and the corresponding 2D ground truth image and a model for a right eye view of the HMD is trained based on the rendered first 2D right eye view image and the corresponding 2D ground truth image. The model is based on information in the IR channels (e.g., based on images of the scene captured under widefield and patterned IR illumination) as well as information in the visible channel. For example, an image is iteratively predicted based on the first 2D left eye view using a neural network or model. Then each iteration of the predicted image is compared to the corresponding 2D ground truth image using a loss function until the loss function is minimized (or below a threshold value). In addition, an image is iteratively predicted based on the first 2D right eye view using a neural network or model. Then each iteration of the predicted image is compared to the corresponding 2D ground truth image using a loss function until the loss function is minimized (or below a threshold value).

FIG. 3B is a schematic flow chart of a process for generating and rendering an image based on compressed image data and a trained machine learning model. The compressed image data and the model are based on information in the IR channels (e.g., based on images of the scene captured under widefield and patterned IR illumination) as well as information in the visible channel. As shown in FIG. 3B, in step S335 compressed video data corresponding to a second 3D video is received. For example, video data captured using a 3D camera rig is captured, compressed and communicated as second 3D video at a remote device (e.g., by a computing device at a remote location). This compressed second 3D video is received by a local device. The second 3D video can be different than the first 3D video.

In step S340 the video data corresponding to the second 3D video is decompressed. For example, the second 3D video (e.g., compressed video data 10) is decompressed using a standard decompression technique corresponding to the standard compression technique used by the remote device.

In step S345 a frame of the second 3D video is selected. For example, a next frame of the decompressed second 3D video can be selected for display on an HMD playing back the second 3D video. Alternatively, or in addition to, playing back the second 3D video can utilize a buffer or queue of video frames. Therefore, selecting a frame of the second 3D video can include selecting a frame from the queue based on a buffering or queueing technique (e.g., FIFO, LIFO, and the like).

In step S350 a second 2D left eye view image is rendered based on the selected frame and a second 2D right eye view image is rendered based on the selected frame. For example, a 3D model of a scene corresponding to a frame of the decompressed second 3D video (e.g., reconstructed video data 15) is communicated to a GPU. The GPU can generate digital images (e.g., left eye view 20 and right eye view 25) based on the 3D model of a scene and return the digital images as the second 2D left eye view and the second 2D right eye view.

In step S355 the second 2D left eye view image is re-rendered using a convolutional neural network architecture and the trained model for the left eye view of the HMD, and the second 2D right eye view image is re-rendered using the convolutional neural network architecture and the trained model for the right eye view of the HMD. For example, the neural network or model trained in phase 1 can be used to generate the re-rendered second 2D left eye view (e.g., re-rendered left eye view 35) as a higher quality representation of the second 2D left eye view (e.g., left eye view 20). The neural network or model trained in phase 1 can be used to generate the re-rendered second 2D right eye view (e.g., re-rendered right eye view 35) as a higher quality representation of the second 2D right eye view (e.g., right eye view 25). Then, in step S360, the re-rendered second 2D left eye view image and the re-rendered second 2D right eye view image are displayed on at least one display of the HMD.

Figure 4:
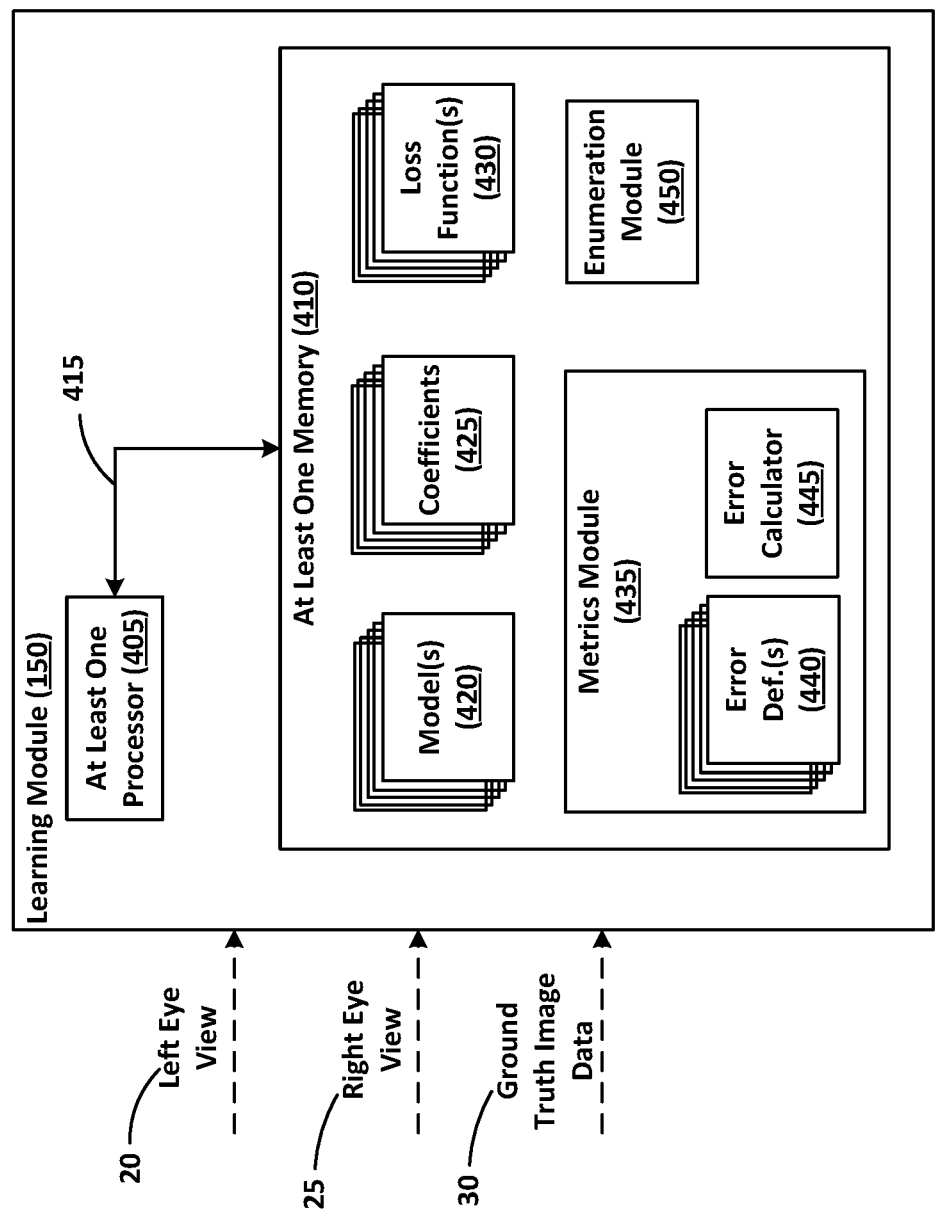
FIG. 4 illustrates a block diagram of a learning module system according to at least one example embodiment.

FIG. 4 illustrates a block diagram of a learning module system according to at least one example embodiment. The learning module 150 may be, or include, at least one computing device and can represent virtually any computing device configured to perform the methods described herein. As such, the learning module 150 can include various components that may be utilized to implement the techniques described herein, or different or future versions thereof. By way of example, the learning module 150 is illustrated as including at least one processor 405, as well as at least one memory 410 (e.g., a non-transitory computer readable medium).

As shown in FIG. 4, the learning module 150 includes the at least one processor 405 and the at least one memory 410. The at least one processor 405 and the at least one memory 410 are communicatively coupled via bus 415. The at least one processor 405 may be utilized to execute instructions stored on the at least one memory 410, so as to thereby implement the various features and functions described herein, or additional or alternative features and functions. The at least one processor 405 and the at least one memory 410 may be utilized for various other purposes. In particular, the at least one memory 410 can represent an example of various types of memory and related hardware and software which might be used to implement any one of the modules described herein.

The at least one memory 410 may be configured to store data and/or information associated with the learning module system 150. For example, the at least one memory 410 may be configured to store model(s) 420, a plurality of coefficients 425 and a plurality of loss functions 430. The at least one memory 410 further includes a metrics module 435 and an enumeration module 450. The metrics module 435 includes a plurality of error definitions 440 and an error calculator 445.

In an example implementation, the at least one memory 410 may be configured to store code segments that when executed by the at least one processor 405 cause the at least one processor 405 to select and communicate one or more of the plurality of coefficients 425. Further, the at least one memory 410 may be configured to store code segments that when executed by the at least one processor 405 cause the at least one processor 405 to receive information used by the learning module 150 system to generate new coefficients 425 and/or update existing coefficients 425. The at least one memory 410 may be configured to store code segments that when executed by the at least one processor 405 cause the at least one processor 405 to receive information used by the learning module 150 to generate a new model 420 and/or update an existing model 420.

The model(s) 420 represent at least one neural network model. A neural network model can define the operations of a neural network, the flow of the operations and/or the interconnections between the operations. For example, the operations can include normalization, padding, convolutions, rounding and/or the like. The model can also define an operation. For example, a convolution can be defined by a number of filters C, a spatial extent (or filter size) K×K, and a stride S. A convolution does not have to be square. For example, the spatial extent can be K×L. In a convolutional neural network context (see FIGS. 6A and 6B) each neuron in the convolutional neural network can represent a filter. Therefore, a convolutional neural network with 8 neurons per layer can have 8 filters using one (1) layer, 16 filters using two (2) layers, 24 filters using three (3) layers . . . 64 filters using 8 layers . . . 128 filters using 16 layers and so forth. A layer can have any number of neurons in the convolutional neural network.

A convolutional neural network can have layers with differing numbers of neurons. The K×K spatial extent (or filter size) can include K columns and K (or L) rows. The K×K spatial extent can be 2×2, 3×3, 4×4, 5×5, (K×L) 2×4 and so forth. Convolution includes centering the K×K spatial extent on a pixel and convolving all of the pixels in the spatial extent and generating a new value for the pixel based on all (e.g., the sum of) the convolution of all of the pixels in the spatial extent. The spatial extent is then moved to a new pixel based on the stride and the convolution is repeated for the new pixel. The stride can be, for example, one (1) or two (2) where a stride of one moves to the next pixel and a stride of two skips a pixel.

The coefficients 425 represent variable value that can be used in one or more of the model(s) 420 and/or the loss function(s) 430 for using and/or training a neural network. A unique combination of a model(s) 420, a coefficients 425 and loss function(s) can define a neural network and how to train the unique neural network. For example, a model of the model(s) 420 can be defined to include two convolution operations and an interconnection between the two. The coefficients 425 can include a corresponding entry defining the spatial extent (e.g., 2×4, 2×2, and/or the like) and a stride (e.g., 1, 2, and/or the like) for each convolution. In addition, the loss function(s) 430 can include a corresponding entry defining a loss function to train the model and a threshold value (e.g., min, max, min change, max change, and/or the like) for the loss.

The metrics module 435 includes the plurality of error definitions 440 and the error calculator 445. Error definitions can include, for example, functions or algorithms used to calculate an error and a threshold value (e.g., min, max, min change, max change, and/or the like) for an error. The error calculator 445 can be configured to calculate an error between two images based on a pixel-by-pixel difference between the two images using the algorithm. Types of errors can include photometric error, peak signal-to-noise ratio (PSNR), structural similarity (SSIM), multiscale SSIM (MS-SSIM), mean squared error, perceptual error, and/or the like. The enumeration module 450 can be configured to iterate over one or more of the coefficients 425.

In an example implementation, one of the coefficients is changed for one of the model(s) 420 by the enumeration module 450 while holding the remainder of the coefficients constant. During each iteration (e.g., an iteration to train the left eye view), the processor 405 predicts an image using the model with the view (e.g., left eye view 20) as input and calculates the loss (possibly using the ground truth image data 30) until the loss function is minimized and/or a change in loss is minimized. Then the error calculator 445 calculates an error between the predicted image and the corresponding image of the ground truth image data 30. If the error is unacceptable (e.g., greater than a threshold value or greater than a threshold change compared to a previous iteration) another of the coefficients is changed by the enumeration module 450. In an example implementation, two or more loss functions can be optimized. In this implementation, the enumeration module 450 can be configured to select between the two or more loss functions.

According to an example implementation, from an image I (e.g., left eye view 20 and right eye view 25) rendered from a volumetric reconstruction (e.g., reconstructed video data 15), an enhanced version of I, denoted as $I_e$ can be generated or computed. The transformation function between I and $I_e$ can target telepresence, VR, or AR applications. Therefore, the following principles should be considered: a) the user typically focuses more on salient features, like faces, and artifacts in those areas should be highly penalized, b) when viewed in stereo, the outputs of the network have to be consistent between left and right pairs to prevent user discomfort, and c) in VR applications, the renderings are composited into the virtual world, requiring accurate segmentation masks. Further, enhanced images should be temporally consistent. A synthesis function F(I) used to generate a predicted image $I_{pred}$ and a segmentation mask $M_{pred}$ that indicates foreground pixels can be defined as $I_e=I_{pred}\odot M_{pred}$ where $\odot$ is the element-wise product, such that background pixels in $I_e$ are set zero.

Figure 9:
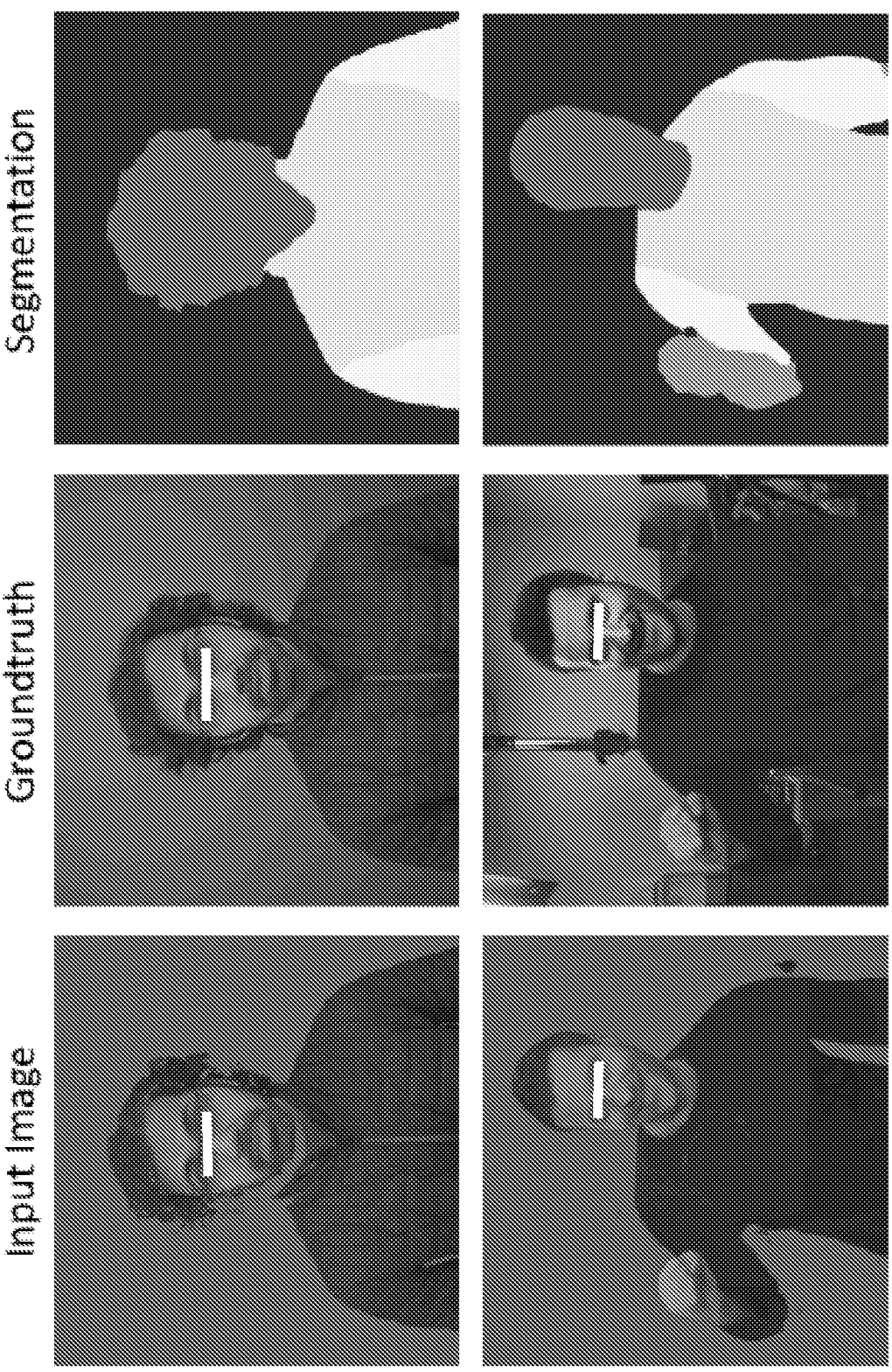
FIG. 9 pictorially illustrates example training data for a convolutional neural network model according to at least one example embodiment.

At training time, a body part semantic segmentation algorithm can be used to generate $I_{seg}$, the semantic segmentation of the ground-truth image $I_{gt}$ captured by the witness camera, as illustrated in FIG. 9 (Segmentation). To obtain improved segmentation boundaries for the subject, the predictions of this algorithm can be refined using a pairwise CRF. This semantic segmentation can be useful for AR/VR rendering.

The training of a neural network that computes F(I) can include training a neural network to optimize the loss function:

$$\mathcal{L} = w_1 \mathcal{L}_{rec} + w_2 \mathcal{L}_{mask} + w_3 \mathcal{L}_{head} + w_4 \mathcal{L}_{temporal} + w_1 \mathcal{L}_{stereo} \qquad (1)$$

where the weights $w_i$ are empirically chosen such that all the losses can provide a similar contribution.

Figure 10A:
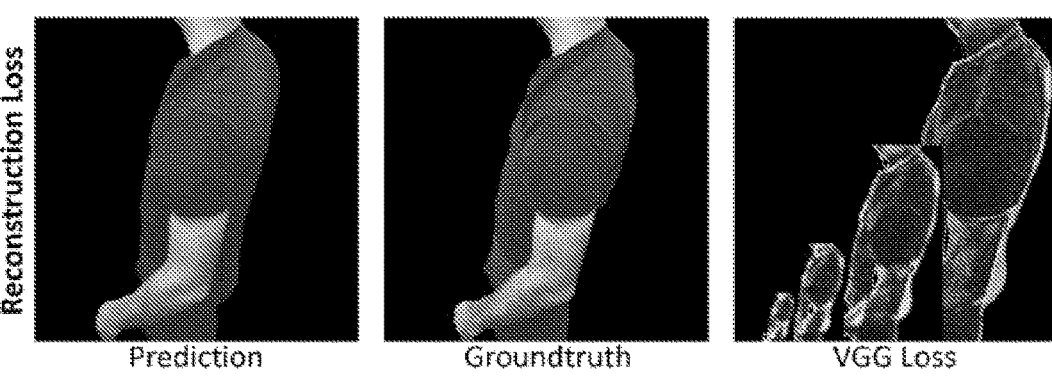
FIG. 10A pictorially illustrates reconstruction loss according to at least one example embodiment.

Instead of using standard $\ell_2$ or $\ell_1$ losses in the image domain, the $\ell_1$ loss can be computed in the feature space of a 16 layer network (e.g., VGG16) trained on an image database (e.g., ImageNet). The loss can be computed as the $\ell-1$ distance of the activations of conv1 through conv5 layers. This gives very comparable results to using a Generative adversarial networks (GAN) loss, without the overhead of employing a GAN architecture during training. Reconstruction Loss $\mathcal{L}_{rec}$ can be computed as:

$$\mathcal{L}_{rec} = \Sigma_{i=1}^{5} \|VGG_i(M_{gt}\odot I_{gt}) - VGG_i(M_{pred}\odot I_{pred})\|, \qquad (2)$$

where $M_{gt}=(I_{seg}\neq background)$ is a binary segmentation mask that turns off background pixels (see FIG. 9), $M_{pred}$ the predicted binary segmentation mask, and $VGG_i(.)$ maps an image to the activations of the conv-i layer of VGG, and $\|.\|^*$ is a "saliency re-weighted" $\ell_1$-norm defined later in this section. The predicted binary segmentation mask, $M_{pred}$, can be predicted based on a combination of both visible light information captured for a frame and IR light captured for a frame. The high contrast between the IR signal for a person and a backdrop that has a high IR reflectivity can be used to delineate background from person and to define the segmentation mask. To speed-up color convergence, a second term can be added to $\mathcal{L}_{rec}$ defined as the $\ell_1$ norm between $I_{gt}$ and $I_{pred}$ that is weighed to contribute 1/10 of the main reconstruction loss. An example of the reconstruction loss is shown in FIG. 10A.

Mask loss $\mathcal{L}_{mask}$ can cause the model to predict an accurate foreground mask $M_{pred}$. This can be seen as a binary classification task. For foreground pixels the value $y^+=1$ is assigned, whereas for background pixels $y^-=0$ is used. The final loss can be defined as:

$$\mathcal{L}_{mask} = \|M_{gt}-M_{pred}\|, \qquad (3)$$

where $\|.\|^*$ is the saliency re-weighted $\ell_1$ loss. Other classification losses such as a logistic loss can be considered.

US 12,561,893 B2

17

Figure 10B:
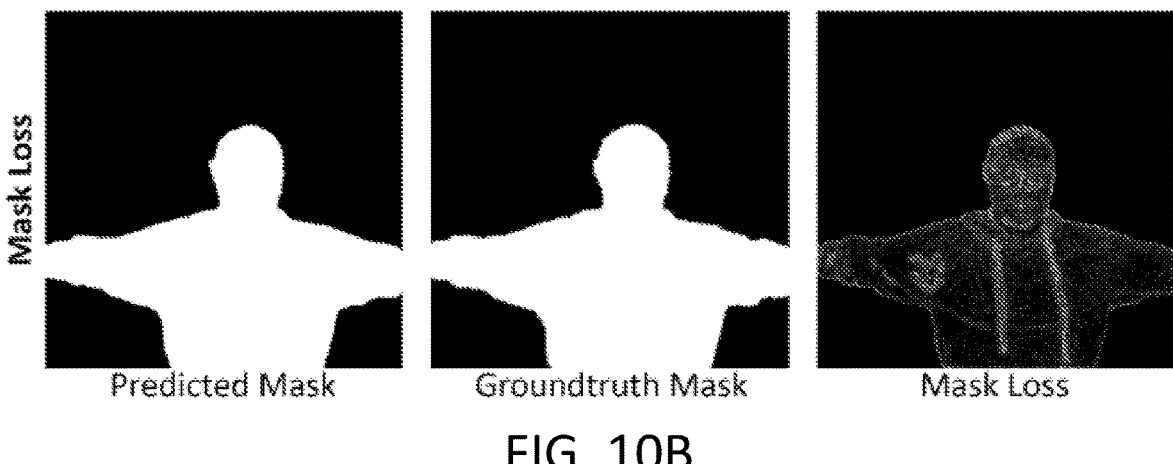
FIG. 10B pictorially illustrates mask loss according to at least one example embodiment.

However, they can produce very similar results. An example of the mask loss $\mathcal{L}_{head}$ is shown in FIG. 10B.

The head loss $\mathcal{L}_{head}$ can focus the neural network on the head to improve the overall sharpness of the face. Similar to the body loss, a 16-layer network (e.g., VGG16) can be used to compute the loss in the feature space. In particular, the crop $I^C$ can be defined for an image I as a patch cropped around the head pixels as given by the segmentation labels of $I_{seg}$ and resized to 512×512 pixels. The loss can be computed as:

$$\mathcal{L}_{head}=\Sigma_{i=1}^{5}\|VGG_i(M_{gt}{}^C\odot I_{gt}{}^C)-VGG_i(M_{pred}{}^C\odot I_{pred}{}^C)\|, \quad (4)$$

Figure 10C:
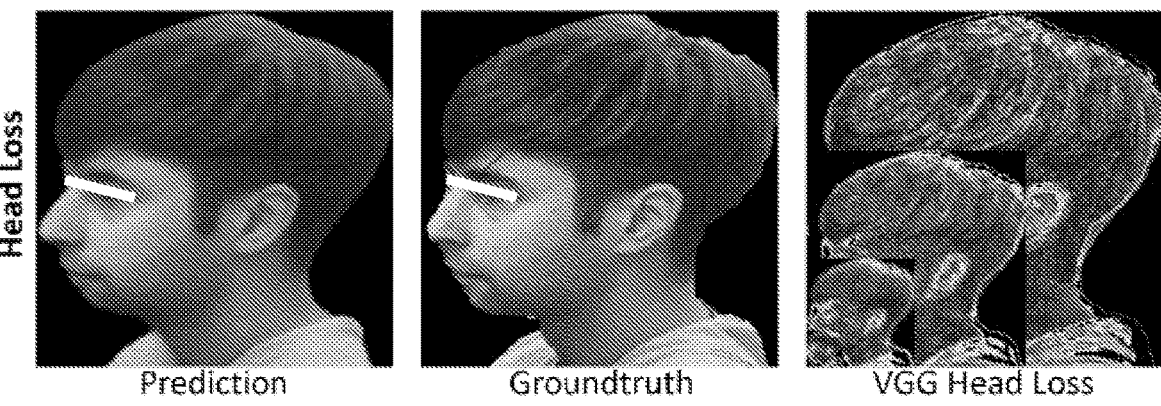
FIG. 10C pictorially illustrates head loss according to at least one example embodiment.

An example of the head loss is shown in FIG. 10C.

Temporal Loss $\mathcal{L}_{temporal}$ can be used to minimize the amount of flickering between two consecutive frames. The temporal loss between a frame $I^t$ and $I^{t-1}$ can be used. Minimizing the difference between $I^t$ and $I^{t-1}$ would produce temporally blurred results. Therefore, a loss that tries to match the temporal gradient of the predicted sequence, i.e. $I_{pred}{}^t-I_{pred}{}^{t-1}$, with the temporal gradient of the ground truth sequence, i.e. $I_{gt}{}^t-I_{gt}{}^{t-1}$ can be used. The loss can be computed as:

$$\mathcal{L}_{temporal}=\|(I_{pred}{}^t-I_{pred}{}^{t-1})-(I_{gt}{}^t-I_{gt}{}^{t-1})\|_1 \quad (5)$$

Figure 10D:
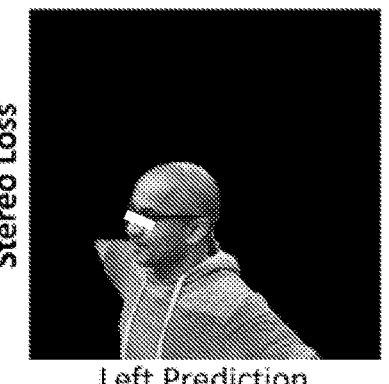
FIG. 10D pictorially illustrates stereo loss according to at least one example embodiment.
Figure 10D:
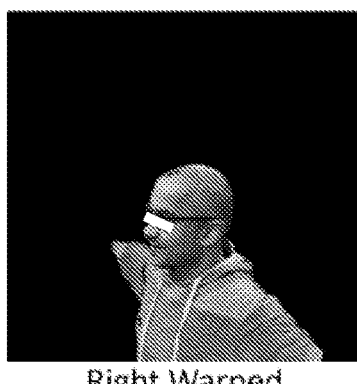
Figure 10D:
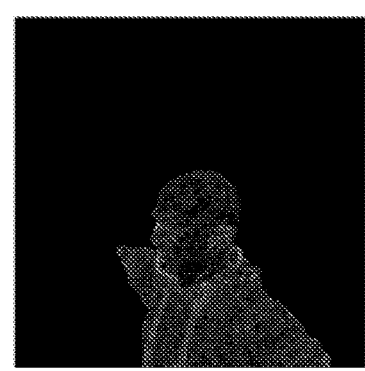
Figure 10E:
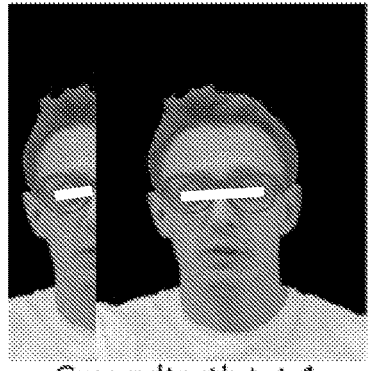
FIG. 10E pictorially illustrates temporal loss according to at least one example embodiment.

An example of the computed temporal loss is shown in FIG. 10E.

Stereo Loss $\mathcal{L}_{stereo}$ can be designed for VR and AR applications, when the neural network is applied on the left and right eye views. In this case, inconsistencies between both eyes may limit depth perception and result in discomfort for the user. Therefore, a loss that ensures self-supervised consistency in the output stereo images can be used. A stereo pair of the volumetric reconstruction can be rendered and each eye's image can be used as input to the neural network, where the left image $I^L$ matches ground-truth camera viewpoint and the right image $I^R$ is rendered at an offset distance (e.g., 65 mm) along the x-coordinate. The right prediction $I_{pred}{}^R$ is then warped to the left viewpoint using the (known) geometry of the mesh and compared to the left prediction $I_{pred}{}^R$. A warp operator $I_{warp}$ can be defined using a Spatial Transformer Network (STN), which uses a bi-linear interpolation of 4 pixels and fixed warp coordinates. The loss can be computed as:

$$\mathcal{L}_{stereo}=\|I_{pred}{}^L-I_{warp}(I_{pred}{}^R)\|_1 \quad (6)$$

An example of the stereo loss is shown in FIG. 10D.

Computing the above losses when training the model can be based on, captured color image data of a scene, captured widefield IR image data of the scene, and depth data based on captured images of patterns of IR light on objects in the scene. Using all of these channels to train the model enhances performance of the model and the accuracy of images generated by the model. For example, if two neighboring pixels have different color and/or albedo values and different depth values, then little or no penalty may be applied the pixels because they are deemed to represent different features. However, if the two neighboring pixels have very similar color and albedo values but different depth values, then an average of the different depth values may be assigned to both of the pixels. Thus, considering all of the captured color image data of a scene, captured widefield IR image data of the scene, and depth data based on captured images of patterns of IR light on objects in the scene when training and applying the model can enhance the ability to distinguish and render edges and smooth surfaces in an image.

The above losses receive a contribution from every pixel in the image (with the exception of the masked pixels). However, imperfections in the segmentation mask, may bias the network towards unimportant areas. Pixels with the highest loss can be outliers (e.g., next to the boundary of the segmentation mask). These outlier pixels can dominate the overall loss (see FIG. 10F). Therefore, down-weighting these outlier pixels to discard them from the loss, while also down-weighing pixels that are easily reconstructed (e.g. smooth and texture-less areas) can be desirable. To do so, given a residual image x of size W×H×C, y can be set as the per-pixel $\ell_1$ norm along channels of x, and minimum and maximum percentiles $p_{min}$ and $p_{max}$ can be defined over the values of y. A pixel's p component of a saliency reweighing matrix of the residual y can be defined as:

$$\gamma_p(y) = \begin{cases} 1 & \text{if } y \in [\Gamma(p_{min}, y), \Gamma(p_{max}, y)] \\ 0 & \text{otherwise} \end{cases} \quad (7)$$

where $\Gamma(i, y)$ extracts the i'th percentile across the set of values in y and $p_{min}$, $p_{max}$, $\alpha_i$ are empirically chosen and depend on the task at hand.

This saliency as a weight on each pixel of the residual y computed for $\mathcal{L}_{rec}$ and $\mathcal{L}_{head}$ can be defined as:

$$\|y\|^* = \|\gamma(y)\odot y\|_1 \quad (8)$$

where $\odot$ is the element-wise product.

Figure 10F:
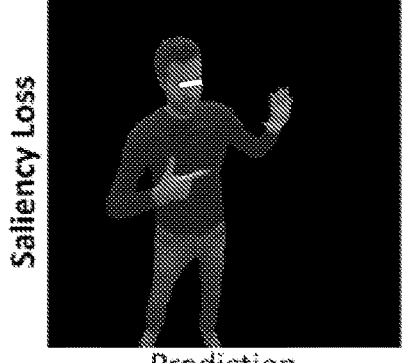
FIG. 10F pictorially illustrates saliency loss according to at least one example embodiment.
Figure 10F:
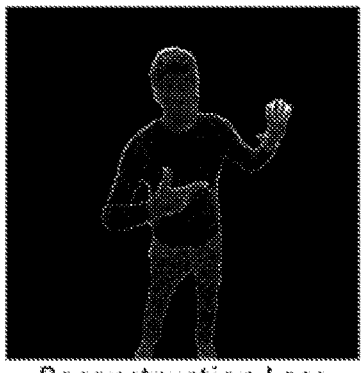
Figure 10F:
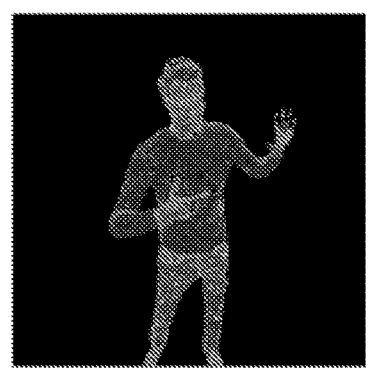

A continuous formulation of $\gamma_p(y)$ defined by the product of a sigmoid and an inverted sigmoid can also be used. Gradients with respect to the re-weighing function are not computed. Therefore, the re-weighing function does not need to be continuous for SGD to work. The effect of saliency reweighing is shown in FIG. 10F. The reconstruction error is along the boundary of the subject when no saliency re-weighing is used. Conversely, the application of the proposed outlier removal technique forces the network to focus on reconstructing the actual subject. Finally, as byproduct of the saliency re-weighing a cleaner foreground mask can be predicted when compared to the one obtained with a semantic segmentation algorithm. The saliency re-weighing scheme may only be applied to the reconstruction, mask, and head losses.

Figure 5:
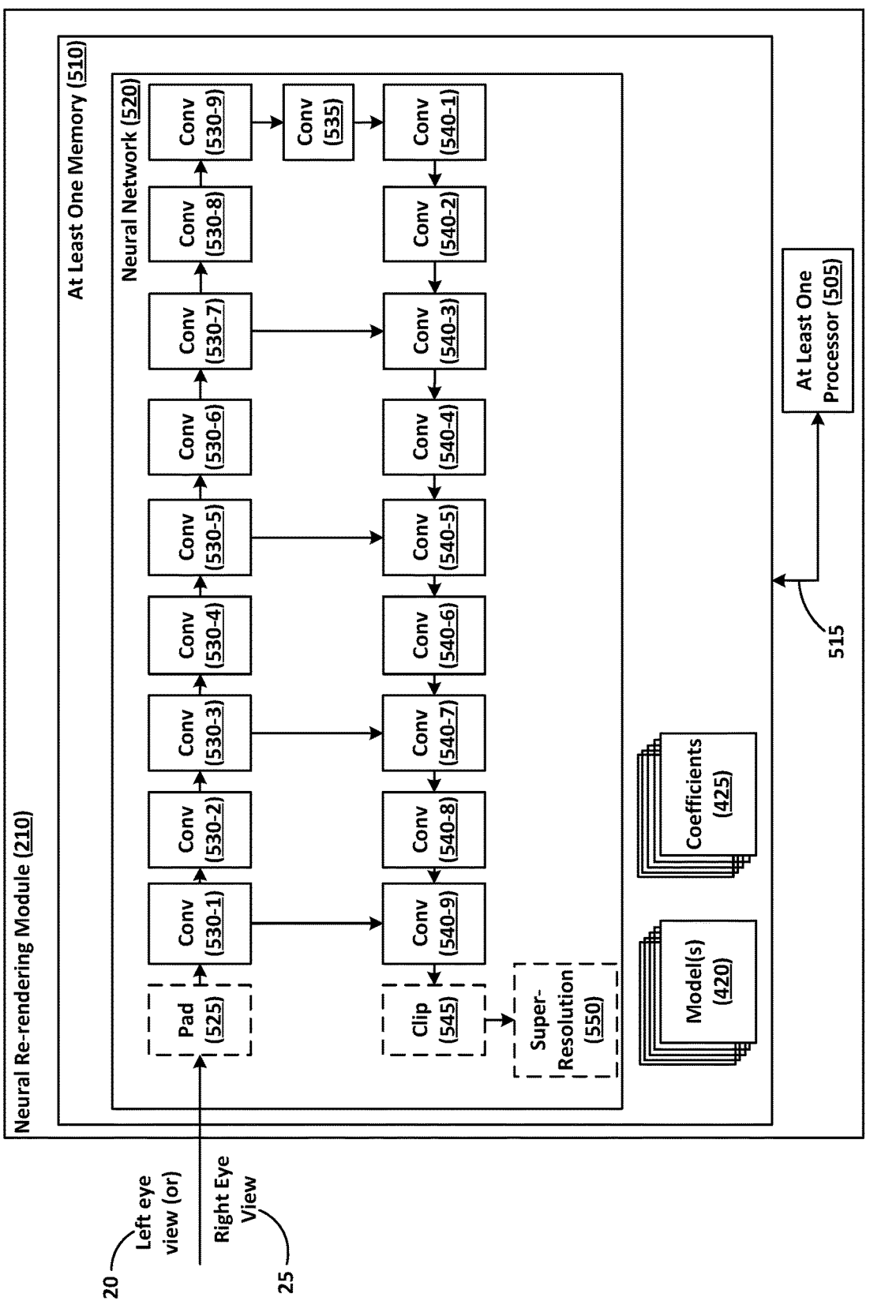
FIG. 5 illustrates a block diagram of a neural re-rendering module according to at least one example embodiment.

FIG. 5 illustrates a block diagram of a neural re-rendering module according to at least one example embodiment. The neural re-rendering module 210 may be, or include, at least one computing device and can represent virtually any computing device configured to perform the methods described herein. As such, the neural re-rendering module 210 can include various components which may be utilized to implement the techniques described herein, or different or future versions thereof. By way of example, the neural re-rendering module 210 is illustrated as including at least one processor 505, as well as at least one memory 510 (e.g., a non-transitory computer readable medium).

As shown in FIG. 5, the neural re-rendering module includes the at least one processor 505 and the at least one memory 410. The at least one processor 505 and the at least one memory 510 are communicatively coupled via bus 515. The at least one processor 505 may be utilized to execute instructions stored on the at least one memory 510, so as to thereby implement the various features and functions described herein, or additional or alternative features and functions. The at least one processor 505 and the at least one memory 510 may be utilized for various other purposes. In particular, the at least one memory 510 can represent an example of various types of memory and related hardware and software which might be used to implement any one of the modules described herein.

The at least one memory 510 may be configured to store data and/or information associated with the neural re-rendering module 210. For example, the at least one memory 510 may be configured to store model(s) 420, a plurality of coefficients 425, and a neural network 520. In an example implementation, the at least one memory 510 may be configured to store code segments that when executed by the at least one processor 505 cause the at least one processor 505 to select one of the models 420 and/or one or more of the plurality of coefficients 425.

The neural network 520 can include a plurality of operations (e.g., convolution 530-1 to 530-9). The plurality of operations, interconnections and the data flow between the plurality of operations can be a model selected from the model(s) 420. The model (as operations, interconnects and data flow) illustrated in the neural network is an example implementation. Therefore, other models can be used to enhance images as described herein.

In the example implementation shown in FIG. 5, the neural network 520 operations include convolutions 530-1, 530-2, 530-3, 530-4, 530-5, 530-6, 530-7, 530-8 and 530-9, convolution 535 and convolutions 540-1, 540-2, 540-3, 540-4, 540-5, 540-6, 540-7, 540-8 and 540-9. Optionally (as illustrated with dashed lines), the neural network 520 operations can include a pad 525, a clip 545 and a super-resolution 550. The pad 525 can be configured to pad or add pixels to the input image at the boundary of the image if the input image needs to be made larger. Padding can include using pixels adjacent to the boundary of the image (e.g., mirror-padding). Padding can include adding a number of pixels with a value of R=0, G=0, B=0 (e.g., zero padding). The clip 545 can be configured to clip any value for R, G, B above 255 to 255 and any value below 0 to 0. The clip 545 can be configured to clip for other color systems (e.g., YUV) based on the max/min for the color system.

The super-resolution 550 can include upscaling the resultant image (e.g., ×2, ×4, ×6, and the like) and applying a neural network as a filter to the upscaled image to generate a high-quality image from the relatively lower quality upscaled image. In an example implementation, the filter is selectively applied to each pixel from a plurality of trained filters.

In the example implementation shown in FIG. 5, the neural network 520 uses a U-NET like architecture. This model can implement viewpoint synthesis from 2D images in real-time on GPUs architectures. The example implementation uses a fully convolutional model (e.g., without max pooling operators). Further, the implementation can use bilinear upsampling and convolutions to minimize or eliminate checkerboard artifacts.

As is shown, the neural network 520 architecture includes 18 layers. Nine (9) layers are used for encoding/compressing/contracting/downsampling and nine (9) layers are used for decoding/decompressing/expanding/upsampling. For example, convolutions 530-1, 530-2, 530-3, 530-4, 530-5, 530-6, 530-7, 530-8 and 530-9 are used for encoding and convolutions 540-1, 540-2, 540-3, 540-4, 540-5, 540-6, 540-7, 540-8 and 540-9 are used for decoding. Convolution 535 can be used as a bottleneck. A bottleneck can be a 1×1 convolution layer configured to decrease the number of input channels for K×K filters. The neural network 520 architecture can include skip connections between the encoder and decoder blocks. For example, skip connections are shown between convolution 530-1 and convolution 540-9, convolution 530-3 and convolution 540-7, convolution 530-5 and convolution 540-5, and convolution 530-7 and convolution 540-3.

In the example implementation, the encoder begins with convolution 530-1 configured with a 3×3 convolution with $N_{init}$ filters followed by a sequence of downsampling blocks including convolutions 530-2, 530-3, 530-4, and 530-5. Convolutions 530-2, 530-3, 530-4, 530-5, 530-6, and 530-7 where i∈{1, 2, 3, 4} can include two convolutional layers each with $N_i$ filters. The first layer, 530-2, 530-4, and 530-6, can have a filter size 4×4, stride 2 and padding 1, whereas the second layer, 530-3, 530-5, and 530-7 can have a filter size of 3×3 and stride 1. Thus, each of the convolutions can reduce the size of the input by a factor of 2 due to the strided convolution. Finally, two dimensionality preserving convolutions, 530-8, and 530-9, are performed. The outputs of the convolutions are can pass through a ReLU activation function. In an example implementation, set $N_{init}=32$ and $N_i=G^i \cdot N_{init}$, where G is the filter size growth factor after each downsampling block.

The decoder includes upsampling blocks 540-3, 540-4, 540-5, 540-6, 540-7, 540-8 and 540-9 that mirror the downsampling blocks but in reverse. Each such block i∈{4, 3, 2, 1} consists of two convolutional layers. The first layer 540-3, 540-5, and 540-7 bilinearly upsamples its input, performs a convolution with Ni filters, and leverages a skip connection to concatenate the output with that of its mirrored encoding layer. The second layer 540-4, 540-6 and 540-8 performs a convolution using $2N_i$ filters of size 3×3. The final network output is produced by a final convolution 540-9 with 4 filters, whose output is passed through a ReLU activation function to produce the reconstructed image and a single channel binary mask of the foreground subject. To produce stereo images for VR and AR headsets, both left and right views are enhanced using the same neural network (with shared weights). The final output is an improved stereo output pair. Data (e.g., filter size, stride, weights, $N_{init}$, $N_i$, $G^i$ and/or the like) associated with neural network 520 can be stored in model(s) 420 and coefficients 425.

Returning to FIG. 4, the model associated with the neural network 520 architecture can be trained as described above. The neural network can be trained using Adam and weight decay algorithms until convergence (e.g., until the point where losses no longer consistently drop).

Random crops of images were used for training, ranging from 512×512 to 960×896. These images can be crops from the original resolution of the input and output pairs. In particular, the random crop can contain the head pixels in 75% of the samples, and for which the head loss is computed. Otherwise, the head loss may be disabled as the network might not see it completely in the input patch. This can result in high quality results for the face, while not ignoring other parts of the body. Using random crops along with standard $\ell$-2 regularization on the weights of the network may be sufficient to prevent over-fitting. When high resolution witness cameras are employed the output can be twice the input size.

The percentile ranges for the saliency re-weighing can be empirically set to remove the contribution of the imperfect mask boundary and other outliers without affecting the result otherwise. When $p_{max}=98$, $p_{min}$ values in range [25, 75] can be acceptable. In particular, $p_{min}=50$ for the reconstruction loss and $p_{min}=25$ for the head loss and $\alpha_1=\alpha_2=1.1$ may be set.

Figures 6A, 6B:
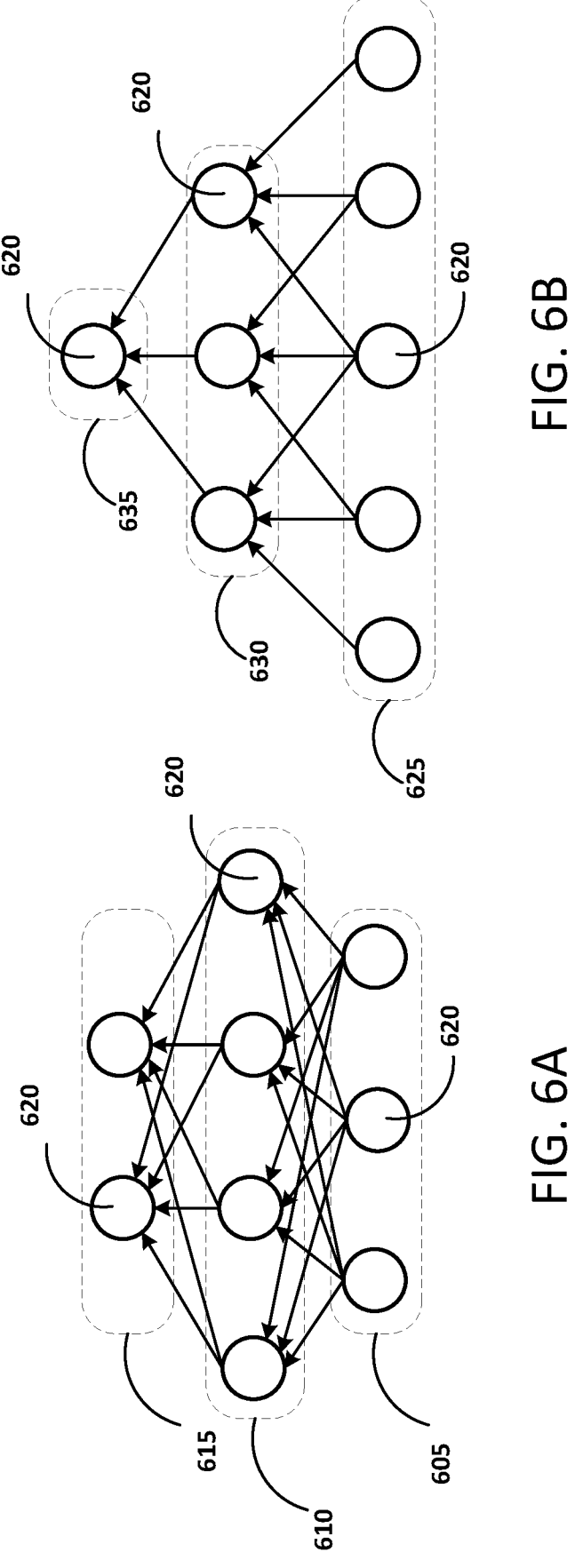
FIG. 6A illustrates layers in a convolutional neural network with no sparsity constraints.
FIG. 6B illustrates layers in a convolutional neural network with sparsity constraints.

FIG. 6A illustrates layers in a convolutional neural network with no sparsity constraints. FIG. 6B illustrates layers in a convolutional neural network with sparsity constraints.

An example implementation of a layered neural network is shown in FIG. 6A as having three layers 605, 610, 615. Each layer 605, 610, 615 can be formed of a plurality of neurons 620. No sparsity constraints have been applied to the implementation illustrated in FIG. 6A, therefore all neurons 620 in each layer 605, 610, 615 are networked to all neurons 620 in any neighboring layers 605, 610, 615. The neural network shown in FIG. 6A is not computationally complex because of the small number of neurons 620 and layers 605, 610, 615. However, the arrangement of the neural network shown in FIG. 6A may not scale up to a larger network size (e.g., the connections between neurons/layers) easily as the computational complexity becomes large as the size of the network scales and scales in a non-linear fashion because of the density of connections.

Where neural networks are to be scaled up to work on inputs with a relatively high number of dimensions, it can therefore become computationally complex for all neurons 620 in each layer 605, 610, 615 to be networked to all neurons 620 in the one or more neighboring layers 605, 610, 615. An initial sparsity condition can be used to lower the computational complexity of the neural network, for example when the neural network is functioning as an optimization process, by limiting the number of connection between neurons and/or layers thus enabling a neural network approach to work with high dimensional data such as images.

An example of a neural network is shown in FIG. 6B with sparsity constraints, according to at least one embodiment. The neural network shown in FIG. 6B is arranged so that each neuron 620 is connected only to a small number of neurons 620 in the neighboring layers 625, 630, 635 thus creating a neural network that is not fully connected and which can scale to function with, higher dimensional data, for example, as an enhancement process for images. The smaller number of connections in comparison with a fully networked neural network allows for the number of connections between neurons to scale in a substantially linear fashion.

Alternatively, in some embodiments neural networks can be use that are fully connected or not fully connected but in different specific configurations to that described in relation to FIG. 6B.

Further, in some embodiments, convolutional neural networks are used, which are neural networks that are not fully connected and therefore have less complexity than fully connected neural networks. Convolutional neural networks can also make use of pooling or max-pooling to reduce the dimensionality (and hence complexity) of the data that flows through the neural network and thus this can reduce the level of computation required.

Figure 11:
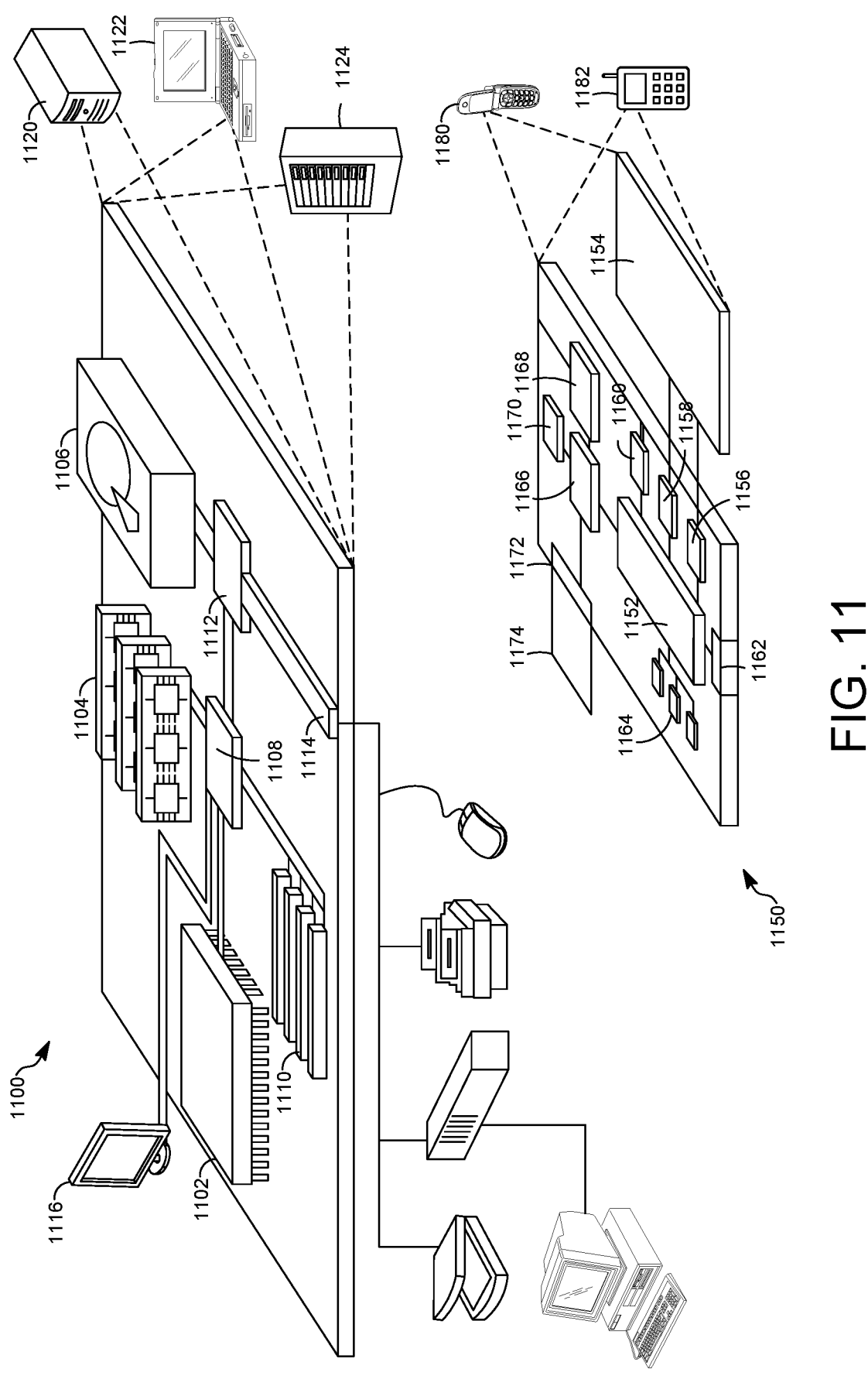
FIG. 11 shows an example of a computer device and a mobile computer device according to at least one example embodiment.

FIG. 11 shows an example of a computer device 1100 and a mobile computer device 1150, which may be used with the techniques described here. Computing device 1100 is intended to represent various forms of digital computers, such as laptops, desktops, workstations, personal digital assistants, servers, blade servers, mainframes, and other appropriate computers. Computing device 1150 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1100 includes a processor 1102, memory 1104, a storage device 1106, a high-speed interface 1108 connecting to memory 1104 and high-speed expansion ports 1110, and a low speed interface 1112 connecting to low speed bus 1114 and storage device 1106. Each of the components 1102, 1104, 1106, 1108, 1110, and 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high speed interface 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a volatile memory unit or units. In another implementation, the memory 1104 is a non-volatile memory unit or units. The memory 1104 may also be another form of computer-readable medium, such as a magnetic or optical disk.

The storage device 1106 is capable of providing mass storage for the computing device 1100. In one implementation, the storage device 1106 may be or contain a computer-readable medium, such as a floppy disk device, a hard disk device, an optical disk device, or a tape device, a flash memory or other similar solid-state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1104, the storage device 1106, or memory on processor 1102.

The high-speed controller 1108 manages bandwidth-intensive operations for the computing device 1100, while the low speed controller 1112 manages lower bandwidth-intensive operations. Such allocation of functions is exemplary only. In one implementation, the high-speed controller 1108 is coupled to memory 1104, display 1116 (e.g., through a graphics processor or accelerator), and to high-speed expansion ports 1110, which may accept various expansion cards (not shown). In the implementation, low-speed controller 1112 is coupled to storage device 1106 and low-speed expansion port 1114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes a processor 1152, memory 1164, an input/output device such as a display 1154, a communication interface 1166, and a transceiver 1168, among other components. The device 1150 may also be provided with a storage device, such as a microdrive or other device, to provide additional storage. Each of the components 1150, 1152, 1164, 1154, 1166, and 1168, are interconnected using various buses, and several of the components may be mounted on a common motherboard or in other manners as appropriate.

The processor 1152 can execute instructions within the computing device 1150, including instructions stored in the memory 1164. The processor may be implemented as a chipset of chips that include separate and multiple analog and digital processors. The processor may provide, for example, for coordination of the other components of the device 1150, such as control of user interfaces, applications run by device 1150, and wireless communication by device 1150.

Processor 1152 may communicate with a user through control interface 1158 and display interface 1156 coupled to a display 1154. The display 1154 may be, for example, a TFT LCD (Thin-Film-Transistor Liquid Crystal Display) or an OLED (Organic Light Emitting Diode) display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may be provide in communication with processor 1152, to enable near area communication of device 1150 with other devices. External interface 1162 may provide, for example, for wired communication in some implementations, or for wireless communication in other implementations, and multiple interfaces may also be used.

The memory 1164 stores information within the computing device 1150. The memory 1164 can be implemented as one or more of a computer-readable medium or media, a volatile memory unit or units, or a non-volatile memory unit or units. Expansion memory 1174 may also be provided and connected to device 1150 through expansion interface 1172, which may include, for example, a SIMM (Single In Line Memory Module) card interface. Such expansion memory 1174 may provide extra storage space for device 1150 or may also store applications or other information for device 1150. Specifically, expansion memory 1174 may include instructions to carry out or supplement the processes described above and may include secure information also. Thus, for example, expansion memory 1174 may be provide as a security module for device 1150 and may be programmed with instructions that permit secure use of device 1150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, or memory on processor 1152, that may be received, for example, over transceiver 1168 or external interface 1162.

Device 1150 may communicate wirelessly through communication interface 1166, which may include digital signal processing circuitry where necessary. Communication interface 1166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1168. In addition, short-range communication may occur, such as using a Bluetooth, Wi-Fi, or other such transceiver (not shown). In addition, GPS (Global Positioning System) receiver module 1170 may provide additional navigation- and location-related wireless data to device 1150, which may be used as appropriate by applications running on device 1150.

Device 1150 may also communicate audibly using audio codec 1160, which may receive spoken information from a user and convert it to usable digital information. Audio codec 1160 may likewise generate audible sound for a user, such as through a speaker, e.g., in a handset of device 1150. Such sound may include sound from voice telephone calls, may include recorded sound (e.g., voice messages, music files, etc.) and may also include sound generated by applications operating on device 1150.

The computing device 1150 may be implemented in a number of different forms, as shown in the figure. For example, it may be implemented as a cellular telephone 1180. It may also be implemented as part of a smart phone 1182, personal digital assistant, or other similar mobile device.

Although the above description describes experiencing traditional three-dimensional (3D) content including accessing a head-mounted display (HMD) device to properly view and interact with such content, described techniques can also be used for rendering to 2D displays (e.g., a left view and/or right view displayed on one or more 2D displays), mobile AR, and to 3D TVs. Further, the use of HMD devices can be cumbersome for a user to continually wear. Accordingly, the user may utilize autostereoscopic displays to access user experiences with 3D perception without requiring the use of the HMD device (e.g., eyewear or headgear). The autostereoscopic displays employ optical components to achieve a 3D effect for a variety of different images on the same plane and providing such images from a number of points of view to produce the illusion of 3D space.

Autostereoscopic displays can provide imagery that approximates the three-dimensional (3D) optical characteristics of physical objects in the real world without requiring the use of a head-mounted display (HMD) device. In general, autostereoscopic displays include flat panel displays, lenticular lenses (e.g., microlens arrays), and/or parallax barriers to redirect images to a number of different viewing regions associated with the display.

In some example autostereoscopic displays, there may be a single location that provides a 3D view of image content provided by such displays. A user may be seated in the single location to experience proper parallax, little distortion, and realistic 3D images. If the user moves to a different physical location (or changes a head position or eye gaze position), the image content may begin to appear less realistic, 2D, and/or distorted. The systems and methods described herein may reconfigure the image content projected from the display to ensure that the user can move around, but still experience proper parallax, low rates of distortion, and realistic 3D images in real time. Thus, the systems and methods described herein provide the advantage of maintaining and providing 3D image content to a user regardless of user movement that occurs while the user is viewing the display.

Figure 12:
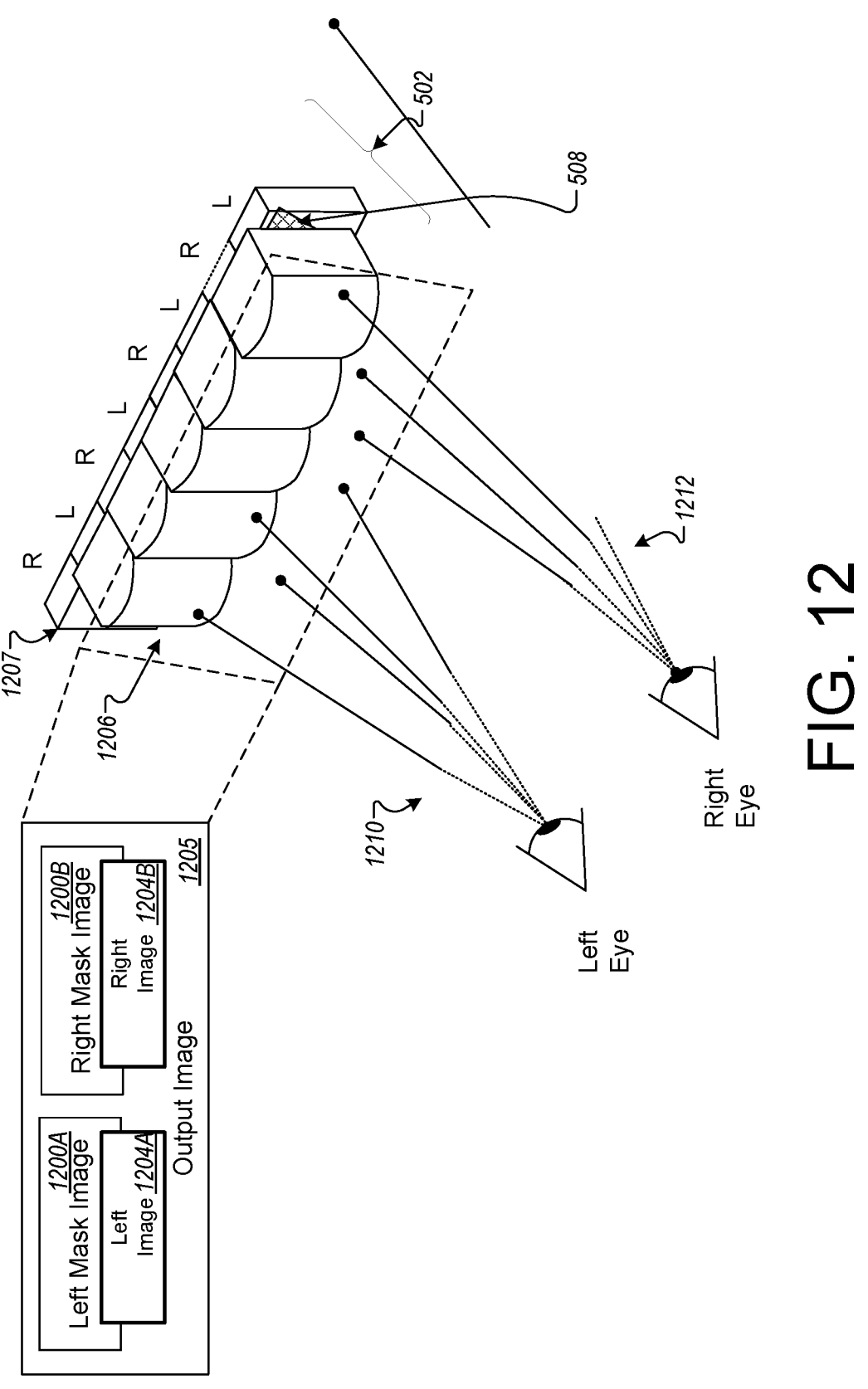
FIG. 12 illustrates a block diagram of an example output image providing content in a stereoscopic display, according to at least one example embodiment.

FIG. 12 illustrates a block diagram of an example output image providing content in a stereoscopic display, according at least one example embodiment. In an example implementation, the content may be displayed by interleaving a left image 1204A with a right image 1204B to obtain an output image 1205. The autostereoscopic display assembly 1202 shown in FIG. 12 represents an assembled display that includes at least a high-resolution display panel 1207 coupled to (e.g., bonded to) a lenticular array of lenses 1206. In addition, the assembly 1202 may include one or more glass spacers 1208 seated between the lenticular array of lenses and the high-resolution display panel 1207. In operation of display assembly 1202, the array of lenses 1206 (e.g., microlens array) and glass spacers 1208 may be designed such that, at a particular viewing condition, the left eye of the user views a first subset of pixels associated with an image, as shown by viewing rays 1210, while the right eye of the user views a mutually exclusive second subset of pixels, as shown by viewing rays 1212.

A mask may be calculated and generated for each of a left and right eye. The masks 1200 may be different for each eye. For example, a mask 1200A may be calculated for the left eye while a mask 1200B may be calculated for the right eye. In some implementations, the mask 1200A may be a shifted version of the mask 1200B. Consistent with implementations described herein, the autostereoscopic display assembly 1202 may be a glasses-free, lenticular, three-dimensional display that includes a plurality of microlenses. In some implementations, an array 1206 may include microlenses in a microlens array. In some implementations, 3D imagery can be produced by projecting a portion (e.g., a first set of pixels) of a first image in a first direction through the at least one microlens (e.g., to a left eye of a user) and projecting a portion (e.g., a second set of pixels) of a second image in a second direction through the at least one other microlens (e.g., to a right eye of the user). The second image may be similar to the first image, but the second image may be shifted from the first image to simulate parallax to thereby simulating a 3D stereoscopic image for the user viewing the autostereoscopic display assembly 1202.

FIG. 13 is a schematic flow chart of a process 1300 implementing techniques described herein. As shown in FIG. 13A, in step 1302 an image rendered based a neural radiance field (NeRF) volumetric representation of a scene is received, where the NeRF representation of the scene is based on captured frames of video data, each captured frame including a color image of the scene, a widefield IR image of the scene captured when the scene is illuminated by a source of widefield IR light, and a plurality of depth IR images of the scene. Each of the depth IR images is captured when the scene is illuminated by a different pattern of points of IR light, and the illumination by the different patterns of points of IR light occurs at different times. The NeRF representation provides a mapping between positions and viewing directions to a color and optical density at each position in the scene, where the color and optical density at each position in the scene enables a viewing of the scene from a new perspective, and the NeRF representation provides a mapping between positions and viewing directions to IR values for each of the different patterns of points of IR light from the new perspective. In step 1304, a synthesizing function is defined to generate an enhanced image from the received image. In step 1306, the synthesizing function is computed using a neural network trained based on minimizing a loss function between a predicted image generated by the neural network and a ground truth image captured by a ground truth camera during training.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method comprising:

receiving an image rendered based on a neural radiance field (NeRF) representation of a scene based on captured frames of video data, at least one of the captured frames including:

a color image of the scene, a widefield infrared (IR) image of the scene captured when the scene is illuminated by a source of widefield IR light, and a plurality of depth IR images of the scene captured when the scene is illuminated by different patterns of points of IR light occurring at different times, the NeRF representation providing a mapping between positions and viewing directions to a color and optical density at each position in the scene to enable a viewing the scene from a new perspective, and the NeRF representation providing a mapping between positions and viewing directions to IR values for each of the different patterns of points of IR light from the new perspective;

defining a synthesizing function to generate an enhanced image from the image; and computing the synthesizing function using a neural network trained based on reducing a loss between a predicted image generated by the neural network and a ground truth image captured by a ground truth camera during training.

2. The method according to claim 1, wherein the method further includes, prior to receiving the image:

capturing a 3D model of a scene using a volumetric capture system; and rendering the image based on the NeRF representation.

3. The method according to claim 2, wherein the ground truth camera and the volumetric capture system are both directed to a view during training, the ground truth camera producing higher quality images than the volumetric capture system.

4. The method according to claim 1, wherein the NeRF representation of the scene is configured to generate, for a plurality of viewing positions and viewing directions with respect to the scene, a position-specific and viewpoint-specific IR image data of the scene.

5. The method according to claim 4, wherein the position-specific and viewpoint-specific IR image data includes wide-field IR image data and patterned IR image data for each of the different patterns of points of IR light.

6. The method according to claim 1, wherein the loss includes a reconstruction loss based on a reconstruction difference between a segmented ground truth image mapped to activations of layers in a neural network and a segmented predicted image mapped to activations of layers in a neural network, the segmented ground truth image being segmented by a ground truth segmentation mask to remove background pixels and the segmented predicted image being segmented by a predicted segmentation mask to remove background pixels, wherein the predicted segmentation mask is predicted based on a combination of both visible light information captured for a frame and IR light captured for a frame.

7. The method according to claim 6, wherein the reconstruction difference is saliency re-weighted to down-weight reconstruction differences for pixels above a maximum error or below a minimum error.

8. The method according to claim 1, wherein the loss includes a mask loss based on a mask difference between a ground truth segmentation mask and a predicted segmentation mask, wherein the predicted segmentation mask is predicted based on a combination of both visible light information captured for a frame and IR light captured for a frame.

9. The method according to claim 1, wherein the predicted image is one of a predicted stereo pair of images and the loss includes a stereo loss based on a stereo difference between the predicted stereo pair of images.

10. The method according to claim 1, wherein the neural network is based on a fully convolutional model.

11. The method according to claim 1, wherein the computing the synthesizing function using a neural network comprises:

computing the synthesizing function for a left eye view-point; and computing the synthesizing function for a right eye view-point.

12. The method according to claim 1, wherein the computing the synthesizing function using a neural network is performed in real time.

13. The method according to claim 1, wherein the color image of the scene for a frame includes a de-mosaiced color channel.

14. The method according to claim 1, wherein the color image of the scene for a frame includes three independent, non-de-mosaiced color channels, and wherein captured frames of video data upon which the NeRF representation of the scene is based include the three independent, non-de-mosaiced color channels.

15. A performance capture system comprising:

a volumetric capture system configured to render at least one image, including imperfections, reconstructed from at least one viewpoint of a captured 3D model, the at least one image being based on a neural radiance field (NeRF) representation; and a rendering system configured to receive the at least one image from the volumetric capture system and to generate, in real time, at least one enhanced image in which the imperfections of the at least one image are reduced, the rendering system including a neural network configured to generate the at least one enhanced image by training prior to use, the training including reducing a loss between predicted images generated by the neural network during training and corresponding ground truth images captured by at least one ground truth camera coordinated with the volumetric capture system during training, wherein the reducing of the loss is based on captured frames of video data, at least one of the each-captured frames including:

a color image of a scene, a widefield infrared (IR) image of the scene captured when the scene is illuminated by a source of widefield IR light, and a plurality of depth IR images of the scene captured when the scene is illuminated by different patterns of points of IR light, the NeRF representation providing a mapping between positions and viewing directions to IR values for each of the different patterns of points of IR light from a new perspective.

16. The performance capture system according to claim 15, wherein the at least one ground truth camera is included in the performance capture system during training and otherwise not included in the performance capture system.

17. The performance capture system according to claim 15, wherein the volumetric capture system includes a single active stereo camera directed to a single view and, during training, includes a single ground truth camera directed to the single view.

18. The performance capture system according to claim 15, wherein the volumetric capture system includes a plurality of active stereo cameras directed to multiple views and, during training, includes a plurality of ground truth cameras directed to the multiple views.

19. The performance capture system according to claim 15, wherein the performance capture system includes a stereo display configured to display one of the at least one enhanced image as a left eye view and one of the at least one enhanced image as a right eye view.

20. The performance capture system according to claim 19, wherein the performance capture system includes a telepresence communication node.

21. The performance capture system according to claim 19, wherein the stereo display is included in an augmented reality (AR) headset.

22. The performance capture system according to claim 19, wherein the stereo display is a head-tracked auto-stereo display.

* * * * *